(12) United States Patent
    Dortschy et al.

(10) Patent No.: US 11,751,158 B2
(45) Date of Patent: Sep. 5, 2023

(54) INTEGRATED ACCESS BACKHAUL (IAB) NODES WITH NEGATIVE PROPAGATION DELAY INDICATION

(71) Applicant: Telefonaktiebolaget LM Ericsson (publ), Stockholm (SE)

(72) Inventors: Boris Dortschy, Hägersten (SE); Erik Dahlman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 61 days.

(21) Appl. No.: 17/438,188

(22) PCT Filed: Mar. 17, 2020

(86) PCT No.: PCT/SE2020/050276
§ 371 (c)(1),
(2) Date: Sep. 10, 2021

(87) PCT Pub. No.: WO2020/197466
PCT Pub. Date: Oct. 1, 2020

(65) Prior Publication Data
US 2022/0182956 A1 Jun. 9, 2022

Related U.S. Application Data

(60) Provisional application No. 62/823,988, filed on Mar. 26, 2019.

(51) Int. Cl.
*H04W 56/00* (2009.01)

(52) U.S. Cl.
CPC ............... *H04W 56/0045* (2013.01)

(58) Field of Classification Search
CPC ........ G01S 13/765; G01S 5/0205; G01S 5/10; G01S 1/20; G01S 11/06; G01S 13/75;
(Continued)

(56) References Cited

U.S. PATENT DOCUMENTS 11,375,527 B1\* 6/2022 Eyuboglu .......... H04B 7/15528
2017/0331577 A1\* 11/2017 Parkvall .................. H04W 4/00
(Continued)

FOREIGN PATENT DOCUMENTS

WO       2018108295 A1      6/2018
WO    WO-2022084833 A1 \*    4/2022

OTHER PUBLICATIONS

3GPP, "3GPP TR 38.874 V0.6.0", 3rd Generation Partnership Project; Technical Specification Group Radio Access Network; Study on Integrated Access and Backhaul; (Release 15), Nov. 2018, 1-93.

(Continued)

*Primary Examiner* — Nathan S Taylor
(74) *Attorney, Agent, or Firm* — Murphy, Bilak & Homiller, PLLC

(57) ABSTRACT

Embodiments include methods for downlink (DL) transmission by a network node in an integrated access backhaul (IAB) network. Such methods include receiving, from an upstream node in the network, first timing offset information related to communications between the network node and the upstream node. Such methods include transmitting a DL signal or channel, to one or more downstream nodes, based on a DL transmission timing for the network node. The DL transmission timing is determined from the network node's DL reception timing of signals or channels transmitted by the upstream node and a second function of the first timing offset information, which is determined based on a first function of the first timing offset information (when the first function is greater than a threshold) or on an alternate timing offset (when the first function is not greater than the threshold). Embodiments also include network nodes configured to perform such methods.

20 Claims, 12 Drawing Sheets

(58) Field of Classification Search
CPC .. G01S 13/76; G01S 5/02; G01S 5/06; H04W 56/009; H04W 64/003; H04W 64/006; H04W 56/00; H04W 64/00; H04W 24/02; H04W 24/10; H04W 4/02; H04W 4/33; H04W 88/00; H04W 52/0206; H04W 52/0212; H04W 52/0225; H04W 52/0251; H04W 52/0229; H04W 84/12; H04W 88/06; H04W 52/02; H04W 56/004; H04W 56/0045; H04L 43/106; H04L 41/046; H04L 41/0806; H04L 41/0895; H04L 41/145; H04L 41/147; H04L 41/149; H04L 41/40; H04L 41/5067; H04L 43/045; H04L 43/08; H04L 43/16; H04L 43/20; H04L 43/50; H04L 65/61; H04L 65/612; H04L 65/762; H04L 65/764; H04L 65/80; H04L 67/02; H04B 17/27

See application file for complete search history.

(56) References Cited

U.S. PATENT DOCUMENTS

| | | | | |
|---|---|---|---|---|
| 2017/0331670 | A1* | 11/2017 | Parkvall | H04L 41/0816 |
| 2019/0110268 | A1* | 4/2019 | Abedini | H04W 56/0015 |
| 2019/0386926 | A1* | 12/2019 | Abedini | H04L 47/283 |
| 2019/0394738 | A1* | 12/2019 | Abedini | H04W 74/0833 |
| 2020/0053682 | A1* | 2/2020 | Abedini | H04W 56/0025 |
| 2020/0059879 | A1* | 2/2020 | Nam | H04W 76/27 |
| 2020/0084819 | A1* | 3/2020 | Abedini | H04W 76/18 |
| 2020/0145952 | A1* | 5/2020 | Keskitalo | H04W 56/007 |
| 2020/0145967 | A1* | 5/2020 | Park | H04W 72/27 |
| 2020/0252847 | A1* | 8/2020 | Park | H04W 36/08 |
| 2021/0135743 | A1* | 5/2021 | Jiang | H04B 7/15542 |
| 2021/0152306 | A1* | 5/2021 | Liu | H04L 5/0094 |
| 2021/0345211 | A1* | 11/2021 | Keskitalo | H04W 84/047 |
| 2021/0345279 | A1* | 11/2021 | Ying | H04W 56/0055 |
| 2021/0352607 | A1* | 11/2021 | Miao | H04W 56/0045 |
| 2021/0385776 | A1* | 12/2021 | Dahlman | H04W 80/02 |
| 2022/0007319 | A1* | 1/2022 | Kim | H04W 56/00 |
| 2022/0070809 | A1* | 3/2022 | Song | H04W 72/0446 |
| 2022/0078740 | A1* | 3/2022 | Harada | H04W 88/14 |

OTHER PUBLICATIONS

3GPP, "3GPP TS 38.401 V15.3.0", 3rd Generation Partnership Project; Technical Specification Group Radio Access Network; NG-RAN; Architecture description (Release 15), Sep. 2018, 1-39.

3GPP, "3GPP TR 38.874 1.0.0", 3rd Generation Partnership Project; Technical Specification Group Radio Access Network; Study on Integrated Access and Backhaul; (Release 15), Dec. 2018, 1-111.

3GPP, "3rd Generation Partnership Project; Technical Specification Group Radio Access Network; NG-RAN; F1 application protocol (F1AP); (Release 15)", 3GPP TS 38.473 V15.0.0, Dec. 2017, 1-90.

3GPP, "3rd Generation Partnership Project; Technical Specification Group Radio Access Network; NR; Physical channels and modulation (Release 15)", 3GPP TS 38.211 V15.4.0, Dec. 2018, 1-96.

3GPP, "3rd Generation Partnership Project; Technical Specification Group Radio Access Network; NR; Physical layer procedures for control (Release 15)", 3GPP TS 38.213 V15.4.0, Dec. 2018, 1-104.

3GPP, "3rd Generation Partnership Project; Technical Specification Group Radio Access Network; NR; Requirements for support of radio resource management (Release 15)", 3GPP TS 38.133 V15.4.0, Dec. 2018, 1-876.

3GPP, "3rd Generation Partnership Project; Technical Specification Group Radio Access Network; Study on new radio access technology: Radio access architecture and interfaces (Release 14)", 3GPP TR 38.801 V14.0 0, Mar. 2017, 1-91.

3GPP, "3rd Generation Partnership Project; Technical Specification Group Services and System Aspects; 3GPP System Architecture Evolution (SAE); Security architecture (Release 15)", 3GPP TS 33.401 V15.0.0, Jun. 2017, 1-153.

3GPP "3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.

Author Unknown, "RAN1 Chairman's Notes", 3GPP TSG RAN WG1 Meeting Ad-Hoc Meeting 1901, Taipei, Taiwan, Jan. 21-25, 2019, 1-30.

Author Unknown, "RAN1 Chairman's Notes", 3GPP TSG RAN WG1 Meeting #96, Athens, Greece, Feb. 25-Mar. 1, 2019, 1-8.

Ericsson, "IAB OTA Timing Alignment", 3GPP RAN1-AH-1901 Meeting, R1-1900733, Taipei, Taiwan, Jan. 21-25, 2019, 1-3.

Nokia et al., "IAB Case #1 timing", 3GPP TSG RAN WG1#96, R1.1902434, Athens, Greece, Feb. 25-Mar. 1, 2019, 1-3.

Nokia, et al., "IAB Synchronization", 3GPP TSG RAN WG1 Meeting 93, R1-1806664, Busan, Korea, May 21- 25, 2018, 1-5.

* cited by examiner

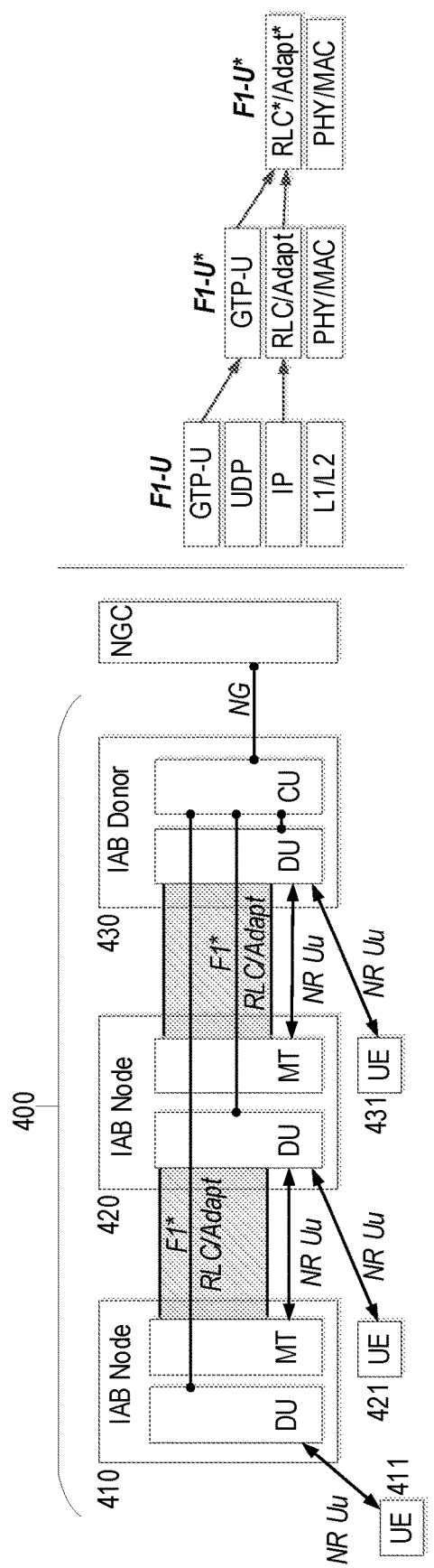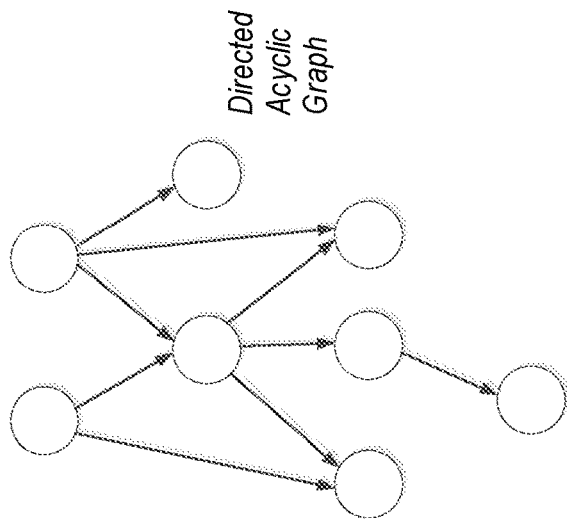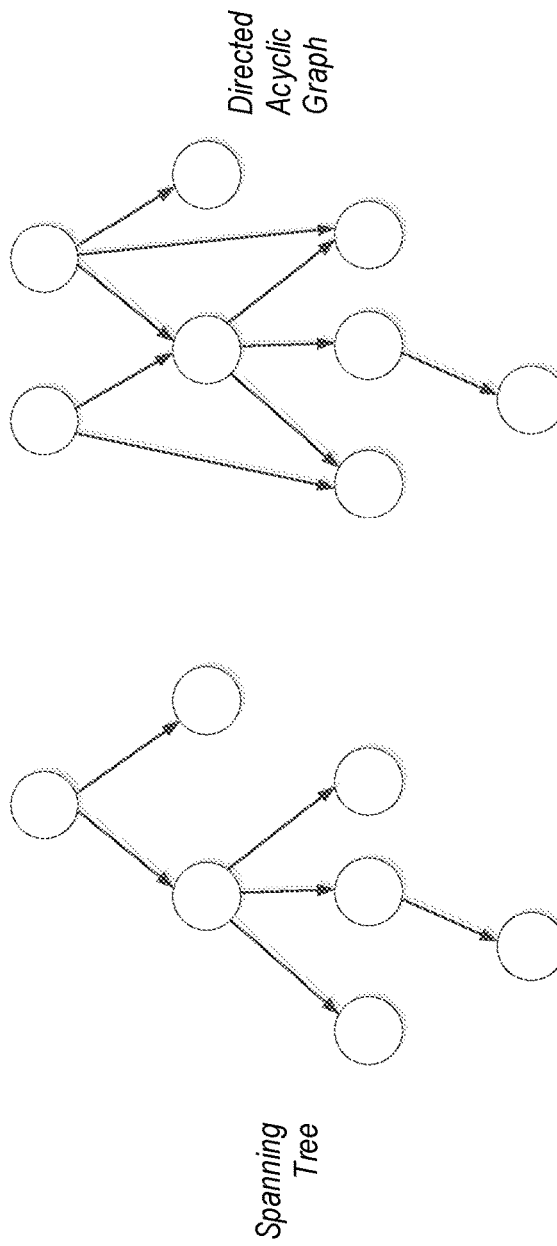
FIG. 4
FIG. 5A
FIG. 5B

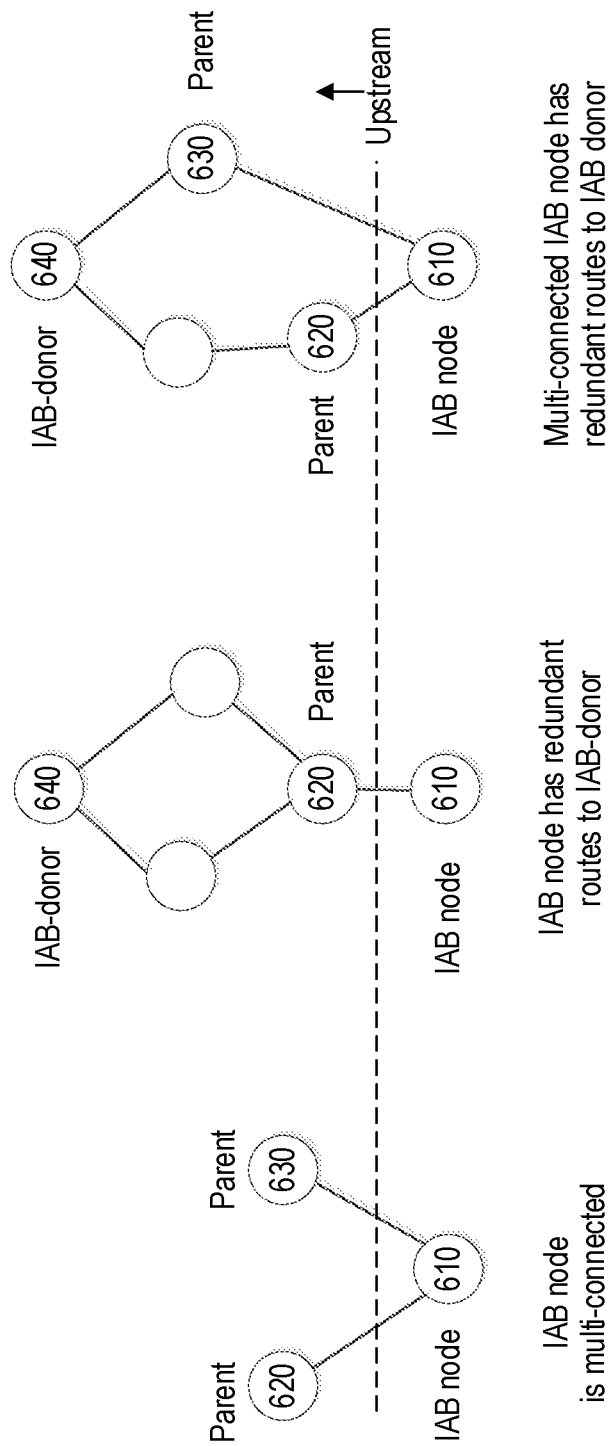

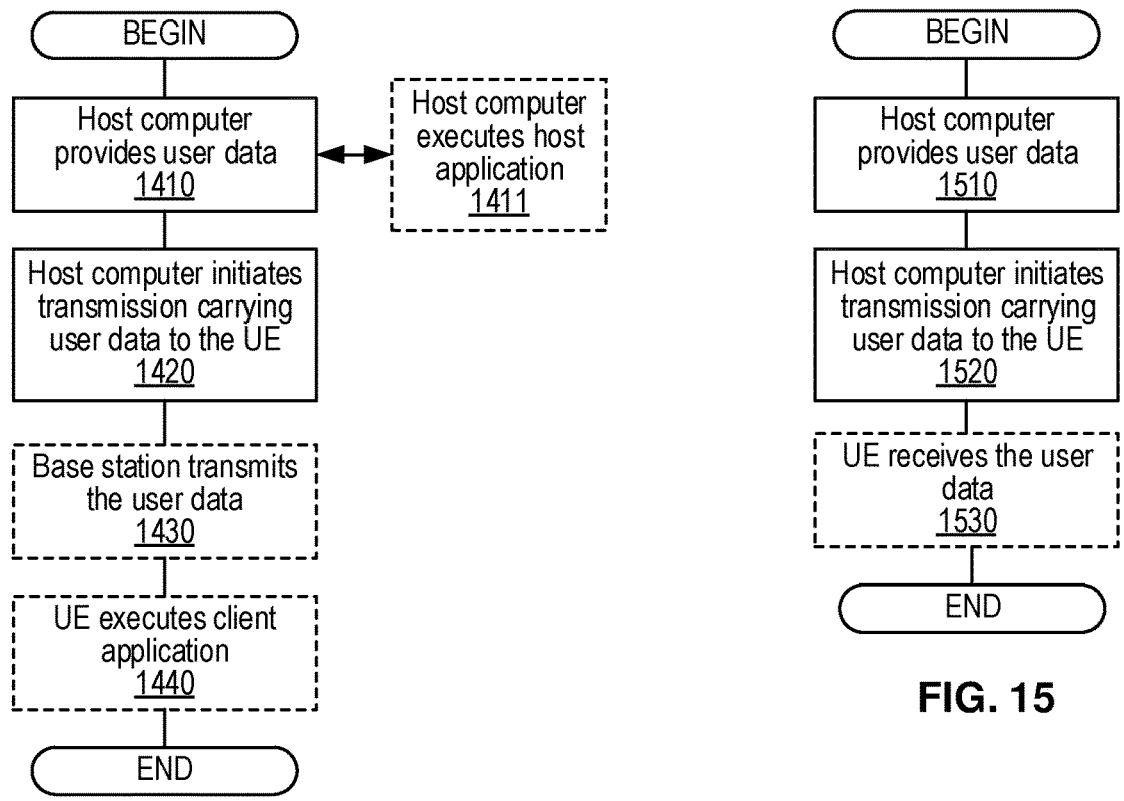
FIG. 14
FIG. 15
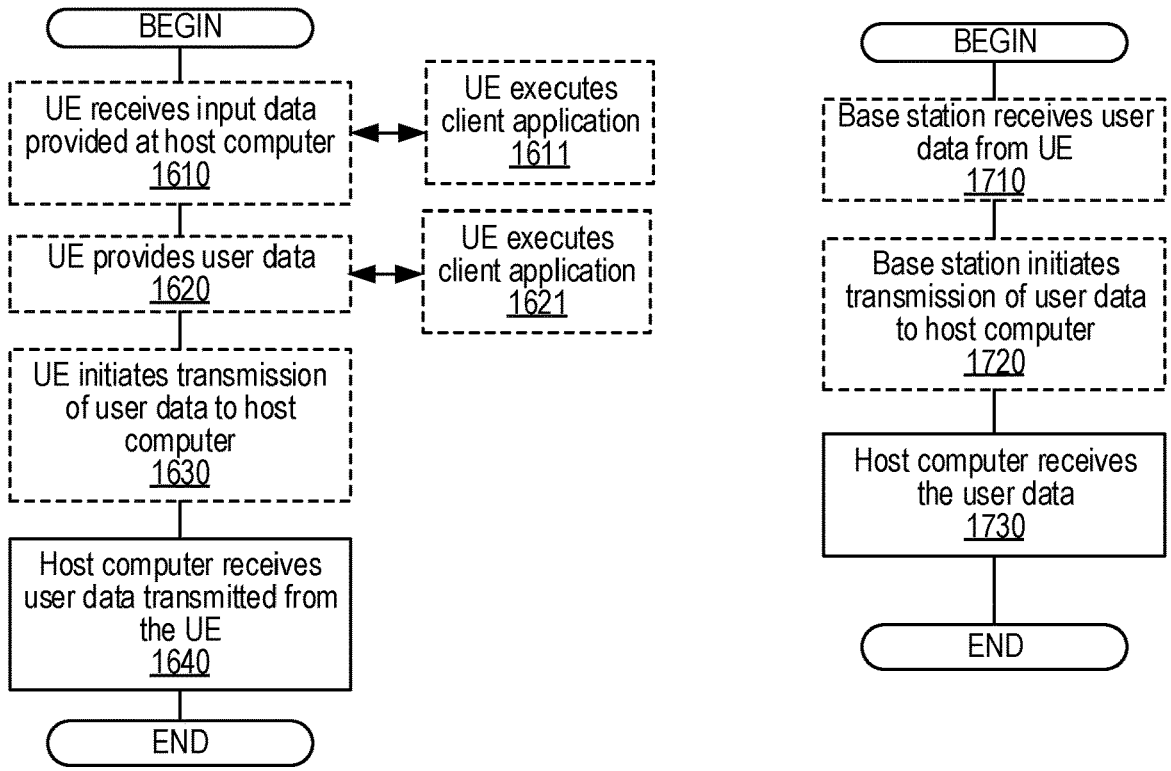
FIG. 16
FIG. 17

INTEGRATED ACCESS BACKHAUL (IAB) NODES WITH NEGATIVE PROPAGATION DELAY INDICATION

TECHNICAL FIELD

The present application relates generally to the field of wireless communication networks, and more specifically to integrated access backhaul (IAB) networks in which the available wireless communication resources are shared between user access to the network and backhaul of user traffic within the network (e.g., to/from a core network).

BACKGROUND

Densification via the deployment of more and more base stations (e.g., macro or micro base stations) is one of the mechanisms that can be employed to satisfy the increasing demand for bandwidth and/or capacity in mobile networks, which is mainly driven by the increasing use of video streaming services. Due to the availability of more spectrum in the millimeter wave (mmw) band, deploying small cells that operate in this band is an attractive deployment option for these purposes. However, the normal approach of connecting the small cells to the operator's backhaul network with optical fiber can end up being very expensive and impractical. Employing wireless links for connecting the small cells to the operator's network is a cheaper and more practical alternative. One such approach is an integrated access backhaul (IAB) network where the operator can utilize part of the radio resources for the backhaul link.

In the IAB architecture, each IAB node includes functionality of both a base station and a mobile terminal (MT). The base station functionality is used for downlink (DL) and uplink (UL) communications with "downstream" nodes, such as other IAB nodes and user equipment (UEs, e.g., wireless devices). In particular, if the downstream node is another IAB node, the base station functionality of the IAB node communicates with the MT functionality of the downstream node. More generally, the MT functionality is used for communication with "upstream" nodes in the network, including other IAB nodes. In the context of the present disclosure, and with respect to a particular IAB node, an upstream node that communicates directly (i.e., without going through an intermediate IAB node) with the particular IAB node will be referred to as a "parent node," and a downstream node that communicates directly with the IAB node will be referred to as a "child node."

In general, an IAB node can derive the DL transmission timing of its parent node from the timing advance (TA) configuration used in the IAB node, together with additional information about the timing alignment of the parent node's DL transmission and UL reception. Such information can be provided by the parent IAB node. Currently, however, there are no limitations on the values provided by the parent IAB node, which can result in various problems, difficulties, and/or issues in relation to the IAB node's DL transmission timing toward downstream nodes (e.g., UEs or child nodes).

SUMMARY

Accordingly, exemplary embodiments of the present disclosure address these and other problems, difficulties, and/or issues in 5G networks comprising IAB nodes, thereby facilitating the otherwise-advantageous deployment of IAB solutions.

Exemplary embodiments of the present disclosure include methods (e.g., procedures) for for adjusting downlink (DL) transmission timing of a network node in an integrated access backhaul (IAB) network. These exemplary methods can be performed by a network node that is configured in an IAB arrangement as a child of an upstream node in the IAB network (e.g., a donor DU or another IAB node). The network node can also be arranged as a parent of one or more downstream nodes (e.g., other IAB nodes and/or UEs) in the IAB network.

These exemplary methods can include receiving, from an upstream node in the IAB network, first timing offset information related to communications between the network node and the upstream node. These exemplary methods can also include transmitting a DL signal or channel, to one or more downstream nodes, based on a DL transmission timing for the network node determined from the network node's DL reception timing of signals or channels transmitted by the upstream node and a second function of the first timing offset information. The second function can be determined based on a first function of the first timing offset information, when the first function is greater than a threshold, or on an alternate timing offset (X) when the first function is not greater than the threshold.

In some embodiments, the first timing offset information can include: a value (TΔ) based on the upstream node's DL transmission timing and the upstream node's UL reception timing; and a timing advance (TA) for the network node's UL transmission timing relative to the network node's DL reception timing with respect to the upstream node. In some embodiments, the first function of the first timing offset information can be TA/2+TΔ. In some embodiments, the threshold can be zero.

In some embodiments, the network node's DL reception timing and UL transmission timing can be associated with a mobile terminal (MT) portion of the network node, and the network node's DL transmission timing can be associated with a distributed unit (DU) portion of the network node.

In some embodiments, the transmitting operations can include determining the DL transmission timing (e.g., used for transmission) by subtracting the second function from the network node's DL reception timing. In some embodiments, the network node's DL transmission timing can be determined such that is substantially synchronized with the upstream node's DL transmission timing.

In some embodiments, the first timing offset can be received at a first time. In such embodiments, these exemplary methods can also include receiving, from the upstream node at one or more previous times before the first time, respective one or more previous versions of the first timing offset information; and determine one or more previous values of the second function based on the respective one or more previous versions of the first timing offset information.

In various embodiments, the alternate timing offset (X) can be zero or a variable. In some embodiments, these exemplary methods can also include determining the alternate timing offset (X) based on a third function of the previous values of the second function. In some embodiments, the third function can be a weighted average or a non-weighted average.

In other embodiments, these exemplary methods can also include determining the alternate timing offset (X) based on a fourth function of a plurality of values of the network node's DL reception timing. In some embodiments, the plurality of values of the network node's DL reception timing include a current timing value and a previous timing value. In such embodiments, the alternate timing offset (X)

can be determined based on the current timing value, the previous timing value, and the most recent previous value of the second function.

In some of these embodiments, these exemplary methods can also include determining the plurality of values of the network node's DL reception timing based on receiving a corresponding plurality of signals from the upstream node at a corresponding plurality of times.

Other embodiments also include network nodes (e.g., IAB nodes and/or components thereof) configured to perform operations corresponding to any of the exemplary methods described herein, as well as IAB networks including such nodes. Other embodiments also include non-transitory, computer-readable media storing computer-executable instructions that, when executed by a processing circuit of such network nodes, configure the same to perform operations corresponding to any of the exemplary methods described herein.

These and other objects, features and advantages of the present disclosure will become apparent upon reading the following Detailed Description in view of the Drawings briefly described below.

BRIEF DESCRIPTION OF THE DRAWINGS

FIG. 4 shows a block diagram of an IAB reference architecture based on the CU/DU split architecture shown in FIG. 1, as illustrated by an exemplary two-hop chain of IAB nodes beneath an IAB donor.

FIG. 5 (which includes FIGS. 5A-5B) and FIG. 6 (which includes FIGS. 6A-6C) show various exemplary network topologies that can be used in 5G IAB networks.

FIGS. 14-17 are flow diagrams of exemplary methods and/or procedures for transmission and/or reception of user data that can be implemented, for example, in the exemplary communication systems and/or networks illustrated in FIGS. 12-13.

DETAILED DESCRIPTION

Figure 1:
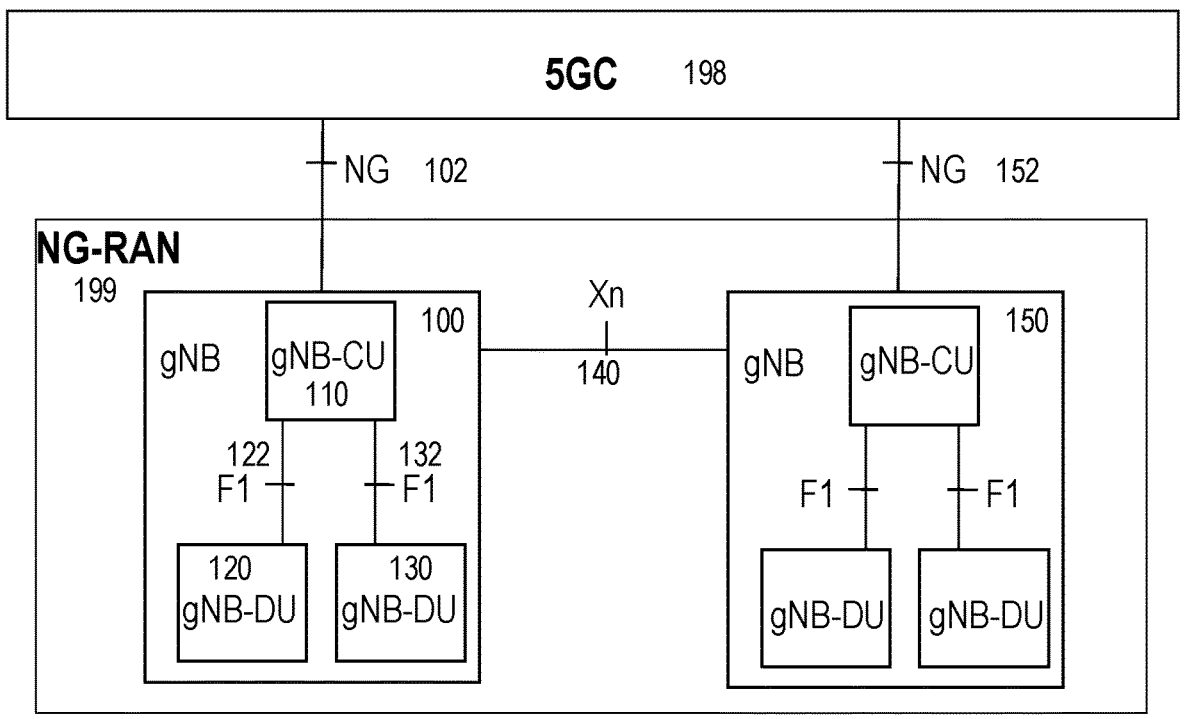
FIG. 1 illustrates a high-level view of the 5G network architecture, including split central unit (CU)-distributed unit (DU) split architecture of gNBs.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are given by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As mentioned above, an IAB node can derive the DL transmission timing of its parent node from the timing advance (TA) configuration used in the IAB node, together with additional information about the timing alignment of the parent node's DL transmission and UL reception. Such information can be provided by the parent IAB node. Currently, however, there are no limitations on the values provided by the parent IAB node, which can result in various problems, difficulties, and/or issues in relation to the IAB node's DL transmission timing toward downstream nodes (e.g., UEs or child nodes). This is discussed in more detail below.

IAB has been studied earlier in 3GPP in the scope of Long Term Evolution (LTE) Rel-10. In that work, an architecture was adopted where a Relay Node (RN) has the functionality of an LTE eNB and UE modem. The RN is connected to a donor eNB which has a S1/X2 proxy functionality hiding the RN from the rest of the network. That architecture enabled the Donor eNB to also be aware of the UEs behind the RN and hide any UE mobility between Donor eNB and Relay Node(2) on the same Donor eNB from the CN. During the Rel-10 study, other architectures were also considered including, e.g., where the RNs are more transparent to the Donor gNB and allocated a separate stand-alone P/S-GW node.

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates a high-level view of a 5G network architecture, including a Next Generation RAN (NG-RAN) 199 and a 5G Core (5GC) 198. NG-RAN 199 can include a set gNBs connected to the 5GC via one or more NG interfaces, such as gNBs 100, 150 connected via interfaces 102, 152, respectively. In addition, the gNBs can be connected to each other via one or more Xn interfaces, such as Xn interface 140 between gNBs 100 and 150.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within an "AMF Region," which is defined in 3GPP TS 23.501. If security protection for CP and UP data on TNL of NG-RAN interfaces is supported, NDS/IP (3GPP TS 33.401) can be applied.

The NG-RAN logical nodes shown in FIG. 1 (and described in TS 38.401 and TR 38.801) include a central (or centralized) unit (CU or gNB-CU) and one or more distributed (or decentralized) units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. Similarly, each DU is a logical node that hosts lower-layer protocols and can include various subsets of the gNB functions, depending on the functional split. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and 5GC 198 as a gNB. In other words, the F1 interface is not visible beyond a gNB-CU. In the split CU-DU architecture shown in FIG. 1, dual connectivity (DC) can be achieved by means of allowing a UE to connect to multiple DUs served by the same CU or by different CUs.

The F1 interface between the gNB-CU and gNB-DU is specified, or based on, the following general principles:
  F1 is an open interface;
  F1 supports the exchange of signalling information between respective endpoints, as well as data transmission to the respective endpoints;
  from a logical standpoint, F1 is a point-to-point interface between the endpoints (even in the absence of a physical direct connection between the endpoints);
  F1 supports control plane (CP) and user plane (UP) separation, such that a gNB-CU may be separated in CP and UP;
  F1 separates Radio Network Layer (RNL) and Transport Network Layer (TNL);
  F1 enables exchange of user-equipment (UE) associated information and non-UE associated information;
  F1 is defined to be future proof with respect to new requirements, services, and functions;

A gNB terminates X2, Xn, NG and S1-U interfaces and, for the F1 interface between DU and CU, utilizes the F1 application part protocol (F1-AP) which is defined in 3GPP TS 38.473.

In some implementations, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

Figure 2:
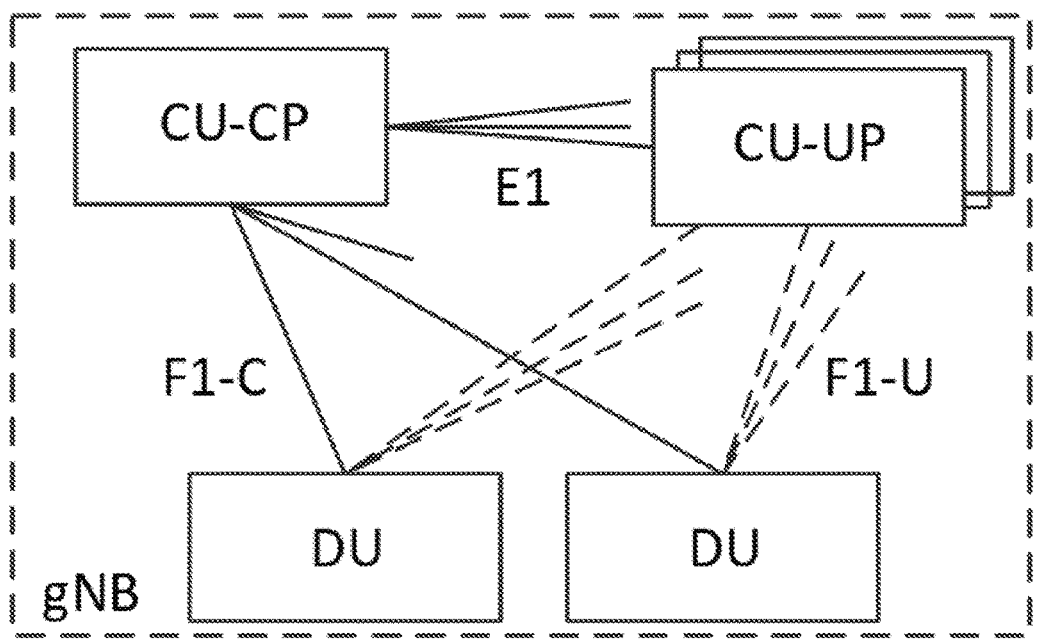
FIG. 2 illustrates the control-plane (CP) and user-plane (UP) interfaces within the split CU-DU architecture shown in FIG. 1.

It has also been agreed in 3GPP RAN3 Working Group (WG) to support a separation of the gNB-CU into a CU-CP function (including RRC and PDCP for signaling radio bearers) and CU-UP function (including PDCP for user plane). The CU-CP and CU-UP parts communicate with each other using the E1-AP protocol over the E1 interface. The CU-CP/UP separation is illustrated in FIG. 2.

Architectures similar to LTE with RNs can be applied to 5G IAB networks. One difference from LTE, however, is the gNB-CU/DU split described above, which separates time critical RLC/MAC/PHY protocols from less time-critical RRC/PDCP protocols. It is anticipated that a similar split could also be applied for 5G IAB nodes. Other IAB-related differences anticipated in 5G as compared to LTE are the support of multiple hops and the support of redundant paths.

In general, however, a goal of 5G IAB is to reuse existing functions and interfaces already defined for UE access. In particular, mobile terminal (MT), gNB-DU, gNB-CU, user plane function (UPF), access management function (AMF), and subscriber management function (SMF) are used as baseline for IAB architectures. In addition, the corresponding interfaces NR Uu (between MT and gNB), F1, NG, X2, and N4 are also reused. However, certain modifications or enhancements to these functions and interfaces are needed for support of IAB, as explained in more detail below.

Figure 3:
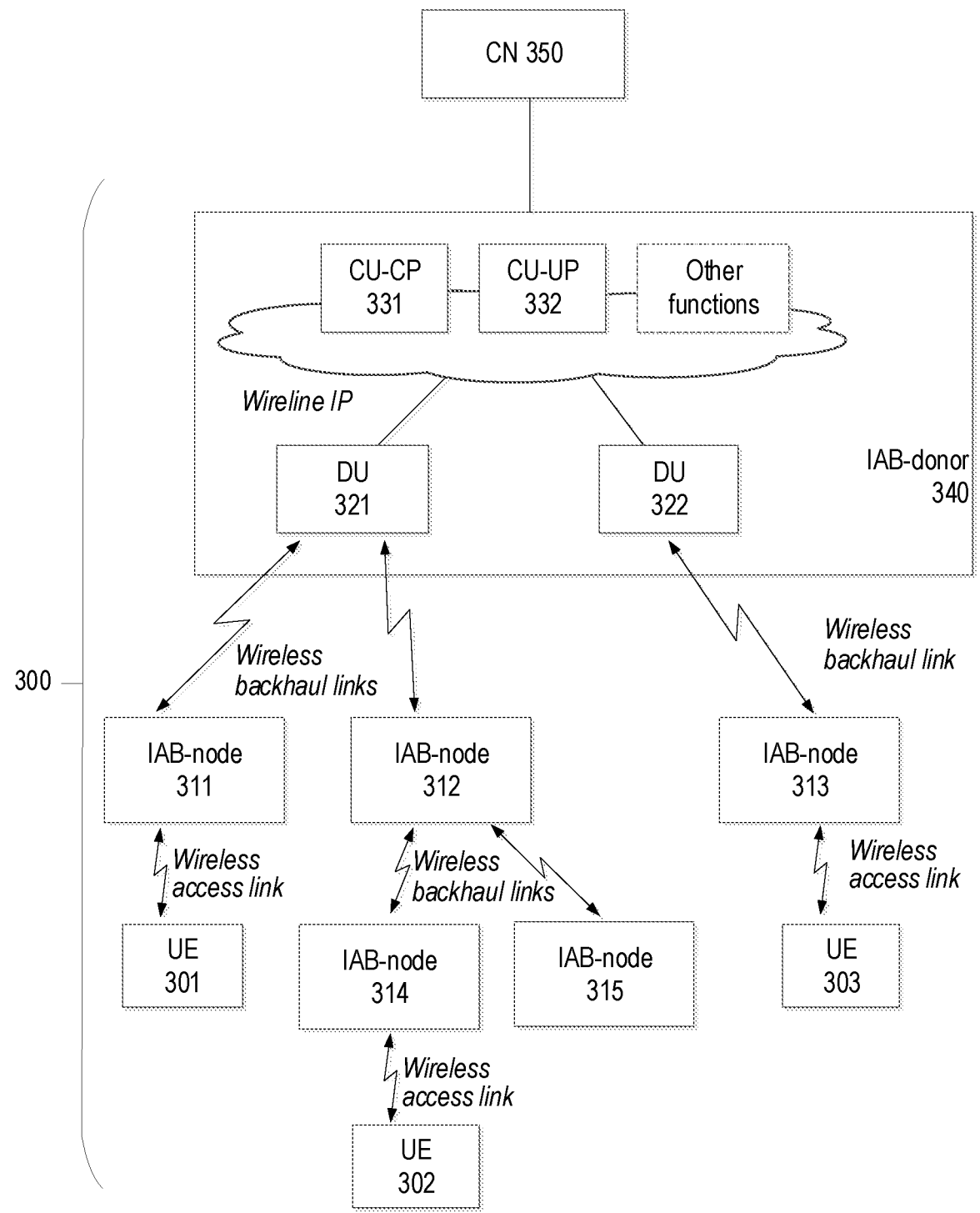
FIG. 3 shows a reference diagram for an integrated access backhaul (IAB) network in standalone mode, as further specified in 3GPP TR 38.874.

FIG. 3 shows a reference diagram for an IAB network in standalone mode, as further explained in 3GPP TR 38.874. The IAB network shown in FIG. 3 includes one IAB-donor 340 and multiple IAB-nodes 311-315, each of which connects to IAB-donor 340 via one or more wireless backhaul links (also referred to as "hops"). As shown in FIG. 3, IAB-nodes 311 and 313-314 also communicate with UEs (e.g., UEs 301-303) using the IAB node DU functionality. The IAB-donor can be treated as a single logical node that comprises a set of functions such as gNB-DUs 321-322, gNBCU-CP 331, gNB-CU-UP 332, and possibly other functions. In some deployments, the IAB-donor can be split according to these functions, which can all be either co-located or non-co-located as allowed by the 3GPP NG-RAN architecture. Also, some of the functions presently associated with the IAB-donor can be moved outside of the IAB-donor if such functions do not perform IAB-specific tasks.

In addition, 3GPP TS 38.874 specifies several reference architectures for supporting user plane (UP) traffic over IAB nodes, including IAB Donor nodes. FIG. 4 shows a block diagram of an exemplary IAB network 400 that is based on a reference architecture "1a", which leverages the CU/DU split architecture in a two-hop chain of IAB nodes underneath an IAB-donor. In this exemplary architecture, the IAB-nodes and UE sconnect in standalone (SA) mode to a NGC.

In this architecture, each IAB node 410-430 of IAB network 400 includes a DU and a mobile terminal (MT). The MT function was previously defined as a component of the Mobile Equipment. In the context of IAB, however, MT is an IAB node function that terminates the radio interface layers of the backhaul Uu interface towards an upstream parent node, such as an IAB donor (e.g., for IAB node 420) or other IAB nodes (e.g., for IAB node 410). An IAB node can connect to more than one upstream node, such as another IAB-node and/or an IAB donor DU. The IAB-node may contain multiple DUs, but each DU part of the IAB-node has F1-C connection only with one IAB-donor CU-CP.

With their respective DU functionality, IAB nodes 410-420 establish RLC channels to respective UEs 411-421 and, in the case of IAB node 420, to an MT of downstream IAB node 410. For MTs, this RLC channel may refer to a modified RLC*. The IAB Donor also includes a DU to support UEs (e.g., 431) and MTs of downstream IAB nodes (e.g., 420). The IAB-donor holds a CU for the DUs of all IAB-nodes and for its own DU. It is assumed that the DUs on an IAB-node are served by only one IAB-donor. This IAB-donor may change through topology adaptation.

Each DU on an IAB-node connects to the CU in the IAB-donor using a modified form of the F1 interface, referred to as F1*. The F1*-U (user plane) runs over RLC channels on the wireless backhaul between the MT on the serving IAB-node and the DU on the donor. F1*-U transport between MT and DU on the serving IAB-node as well as between DU and CU on the donor is for further study. An adaptation layer is added, which holds routing information, enabling hop-by-hop forwarding. It replaces the IP functionality of the standard F1-stack. F1*-U may carry a GTP-U header for the end-to-end association between CU and DU. In a further enhancement, information carried inside the GTP-U header may be included into the adaption layer. More generally, in the architecture show in FIG. 4, information carried on the adaptation layer supports the following functions:

Routing across the wireless backhaul topology,
QoS-enforcement by the scheduler on DL and UL on the wireless backhaul link,
Mapping of UE user-plane PDUs to backhaul RLC channels, and
Identification of the UE-bearer for each PDU.

The right side of FIG. 4 shows two examples of such F1*-U protocol stacks. In this figure, enhancements of RLC are referred to as RLC*. The MT of each IAB-node further sustains NAS connectivity to the NGC, e.g., for authentication of the IAB-node. It further sustains a PDU-session via the NGC, e.g., to provide the IAB-node with connectivity to the OAM. Details of F1*, the adaptation layer, RLC*, hop-by-hop forwarding, and transport of F1-AP are for further study. Protocol translation between F1* and F1 in case the IAB-donor is split is also for further study.

Wireless backhaul links are vulnerable to blockage, e.g., due to moving objects such as vehicles, due to seasonal changes (foliage), or due to infrastructure changes (new buildings). Such vulnerability also applies to physically stationary IAB-nodes. Also, traffic variations can create uneven load distribution on wireless backhaul links leading to local link or node congestion. These considerations can affect choice of network topology.

FIG. 5, which includes FIGS. 5A-5B, shows two exemplary network topologies that can be used in 5G IAB networks. FIG. 5A shows a spanning tree (ST) topology, where each IAB child (or downstream) node is connected to single IAB parent (or upstream) node. In contrast, FIG. 5B shows a directed acyclic graph (DAG) topology in which several of the IAB child nodes are connected to more than one IAB parent node. These redundant connections to multiple parent (or upstream) nodes can increase the network reliability during blockage and/or congestion, as discussed above.

FIG. 6, which includes FIGS. 6A-6C, shows three exemplary DAG network topologies that can be used in 5G IAB networks. In FIG. 6A, IAB node 610 is "multi-connected," such that it has links to multiple parent nodes 620 and 630. In FIG. 6B, IAB node 610 has multiple routes to an IAB donor 640, albeit through a single parent node 620. As such, the multiple routes are not independent. In FIG. 6C, IAB node 610 has multiple routes to IAB donor 640 through multiple parent nodes 620-630. In this case, the multiple routes are independent. In general, the topology shown in FIG. 6C provides greater redundancy and reliability compared the topologies shown in FIGS. 6A-6B.

3GPP TS 38.133 (v.15.4.0) defines various requirements on the cell phase synchronization, which affects the transmission timing alignment in downlink (DL) transmissions over access links. This includes transmissions from upstream IAB nodes to downstream IAB nodes, and from IAB nodes to UEs. For time-division-duplexing (TDD) arrangements, cell phase synchronization accuracy is defined as a maximum absolute deviation in frame start timing between any pair of cells on the same frequency that have overlapping coverage areas. More specifically, the cell phase synchronization measured at antenna connectors for the respective nodes shall be less than three microseconds (3 μs).

Figure 7:
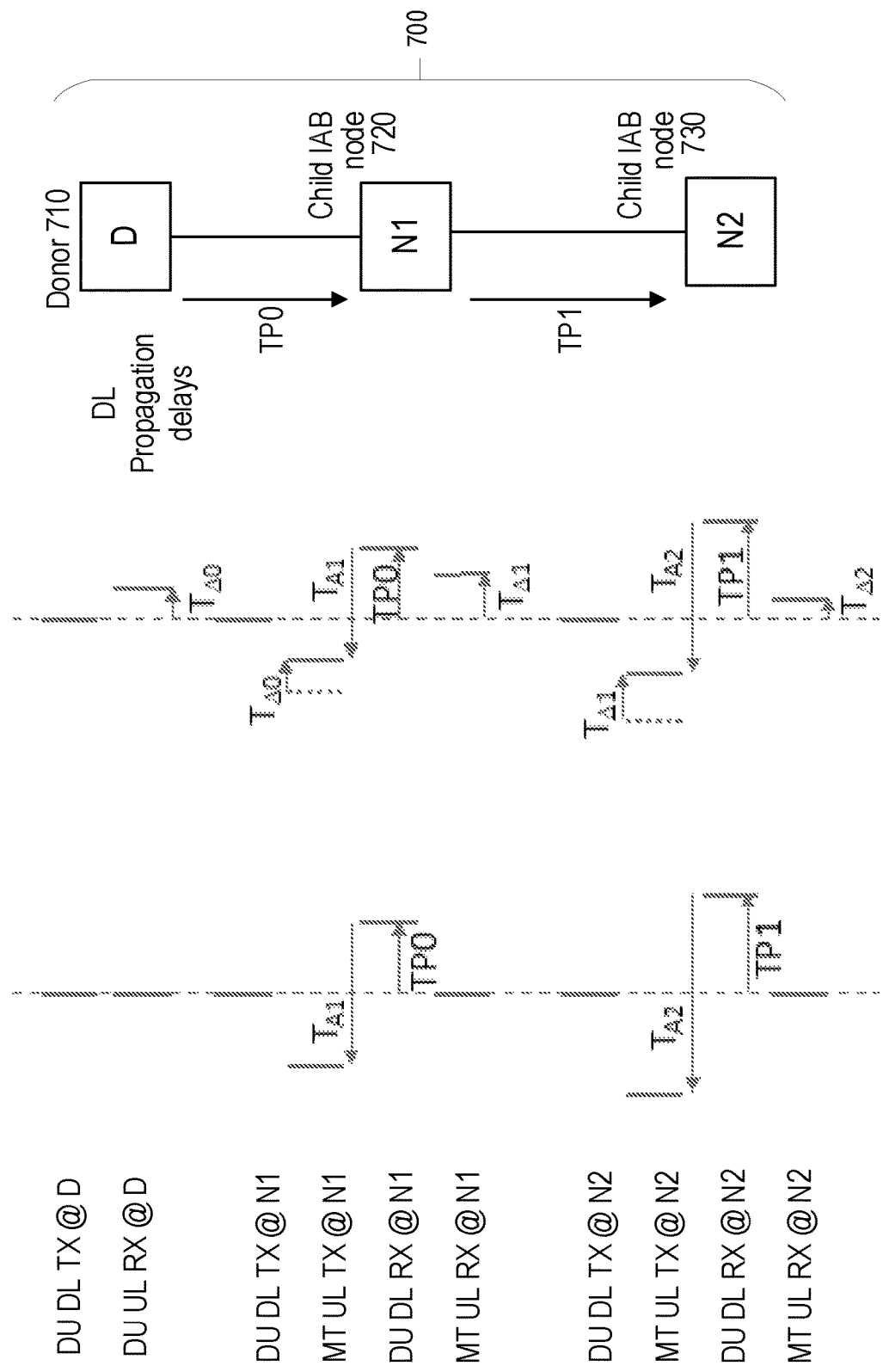
FIG. 7 illustrates an exemplary timing alignment of time-division duplexed (TDD) UL/DL transmission and reception among an IAB donor (D) and two IAB nodes (N1 and N2).

As briefly discussed above, a child IAB node can derive its parent's DL transmission timing from the timing advance (TA) configuration used in the child IAB node, together with additional information—signalled from the parent IAB node—about the parent's timing alignment of DL transmission and UL reception. Currently, however, there are no limitations on the values provided by the parent node, which can result in various problems, difficulties, and/or issues in the child IAB node, such as a negative UL-DL timing offset FIG. 7 illustrates an exemplary timing alignment of TDD UL/DL transmission and reception among an IAB donor (D, also labelled 710) and two child IAB nodes (N1 and N2, also labelled 720 and 730, respectively). Each of the IAB nodes includes DU and MT functionality, as illustrated in FIG. 4. As shown in FIG. 7, there is a propagation delay TP0 between D and N1, and a propagation delay TP1 between N1 and N2. In addition, each of the nodes has a specific delay, offset, and/or difference between its DL transmission and UL reception, denoted as values TΔ0, TΔ1, and TΔ2, respectively, in FIG. 7. Each of these values is intended to account for factors such as Tx-to-Rx switching time, hardware limitations or impairments, etc. Furthermore, both N1 and N2 can derive a timing advance (TA) value representing the timing gap between each node's own UL transmission to and DL reception from the respective parent node. More specifically, N2 derives the value TA2 with respect to N1, and N1 derives the value TA1 with respect to D.

Conventionally, an IAB node (e.g., N1) should set its DU DL transmission timing ahead of its MT DL reception timing based on a function of the timing information TA and TΔ, e.g., by the amount of TA/2+TΔ. This can be expressed as:

DU DL $Tx$@child=(MT DL $Rx$@child)−(TA/2+TΔ).

The value of TΔ can be signaled from the parent node where it was derived, and the value of TA can be signalled to and/or derived by the child node as specified in Rel-15 of the 3GPP specifications. As such, this transmission timing of the child node is under control of the parent node via the signalling of the TΔ value and/or TA value. Further, 3GPP specifications require DU DL transmission timing at the child node to be substantially equal to (e.g., in sync with) the DU DL transmission timing of the parent node. This can be expressed as:

DU DL $Tx$@child=DU DL $Tx$@parent.

One principle underlying this choice of timing offset is that TA/2+TΔ should reflect the propagation delay between the parent node's DL transmission and the child IAB node's DL reception (e.g., TP0 or TP1 in FIG. 7). This implies that TA/2+TΔ should be strictly non-negative. This is reasonable, since, if the child IAB node should attempt to set its DU DL transmission timing identical to the parent node's DU DL transmission timing, the child IAB node should not set its DU DL transmission timing after its MT DL reception timing. However, nothing prevents the parent node from signaling a configuration of TA and/or TΔ that makes (TA/2+TΔ) negative. Moreover, even if the parent node signalled a non-negative configuration, errors in the signalling (e.g., due to degraded or blocked channel conditions) could cause the child node to interpret the received information as a negative configuration. In either case, setting an IAB node's DU DL transmission timing after its MT DL reception timing can result in spurious operation of the IAB node.

Exemplary embodiments of the present disclosure address these and other problems, challenges, and/or issues by facilitating, enabling, and/or allowing a child IAB node to operate its DU DL transmission under reasonable timing conditions even if the information from a parent node (TA and/or TΔ) about the parent node's DL transmission timing alignment cannot be correct. In general, exemplary embodiments include techniques for comparing the parent-provided timing information to a threshold, and adjusting the child node's DU DL Tx/MT DL RX timing difference differently depending on whether the timing information is greater than, or not greater than, the threshold.

In various embodiments, if TP denotes the DL physical propagation delay between parent and child IAB node (e.g., TP0 and TP1 in FIG. 7), a parent-child node timing relationship is given by:

MT DL $Rx$@child=$TP$+(DU DL $Tx$@parent).

TP is a physical property that must be greater than zero. If the DL synchronization relationship DU DL $Tx$@child=DU DL $Tx$@parent is maintained, then the child IAB node MT DL Rx timing cannot be before the same node's DU DL Tx timing.

For convenience, the variable T_shift(n) is used in the following explanation to refer to the child node's n-th update of the function (TA/2+TΔ), based on timing information values TA and TΔ received from the parent node. Likewise, the variable DU DL Tx(n−1) @ child is used to refer to the DL transmission timing at the child IAB node after its (n−1)-th update but before its n-th update. Similarly, the variable MT DL Rx(n) @ child is used to refer to the DL reception timing at the child IAB node at the time of the n-th update of the child's DL transmission timing. In various embodiments, the relationship of the child's DU DL transmission timing to its MT DL reception timing at the n-th update can be expressed based on this nomenclature as:

DU DL $Tx(n)$@child=MT DL $Rx(n)$@child−
$T\_hat\_shift(n)$, where $T\_hat\_shift(n) = T\_shift(n)$, if $T\_shift(n) >$ threshold, $T\_hat\_shift(n) = X$, if $T\_shift(n) \leq$ threshold.

In some embodiments, the threshold can be zero. In such embodiments, DU DL TX (n) can be updated based on the current offset value, $T\_shift(n)$, if that offset is positive, but updated based on the alternate offset X if that value is not positive. Other threshold values are also possible. For example, a small positive value can be used as the threshold.

In some embodiments, the alternate offset X can be a fixed, pre-determined, and/or pre-configured value, such as zero (i.e., X=0) or some small positive value. In other embodiments, the alternate value X can be a variable (referred to as X(n)) computed as a function of one more other relevant timing values. One such embodiment is given by:

$X(n)$=(MT DL $Rx(n)$@child)−(MT
DL $Rx(n−1)$@child)+$T\_hat\_shift(n−1)$.

An effect of this embodiment is to maintain same value for update n as in update n−1, i.e., DU DL $Tx(n)$@child=MT DL $Rx(n−1)$@child−
$T\_hat\_shift(n−1)$.

As another alternative, the variable alternate value X(n) can be computed as any function of multiple previous updates of T_hat_shift. In general terms, this can be expressed as the function:

$X(n) = f(T\_hat\_shift(i))$, $i = n−1, n−2$, etc.

As an example, X(n) can be a weighted or non-weighted average of the k most recent updates of T_hat_shift.

The embodiments described above can be further illustrated by FIG. 8, which shows an exemplary method (e.g., procedure) for adjusting downlink (DL) transmission timing of a network node in an integrated access backhaul (IAB) network, according to various exemplary embodiments of the present disclosure. The exemplary method shown in FIG. 8 can be performed by a network node, in a radio access network (RAN), that is configured in an IAB arrangement as a child of (e.g., immediately downstream to) an upstream node in the IAB network (e.g., a donor DU or another IAB node). The network node can also be arranged as a parent of (e.g., immediately upstream to) one or more downstream nodes (e.g., other IAB nodes and/or UEs) in the IAB network. Examples of such arrangements are shown in FIGS. 3-6.

Figure 8:
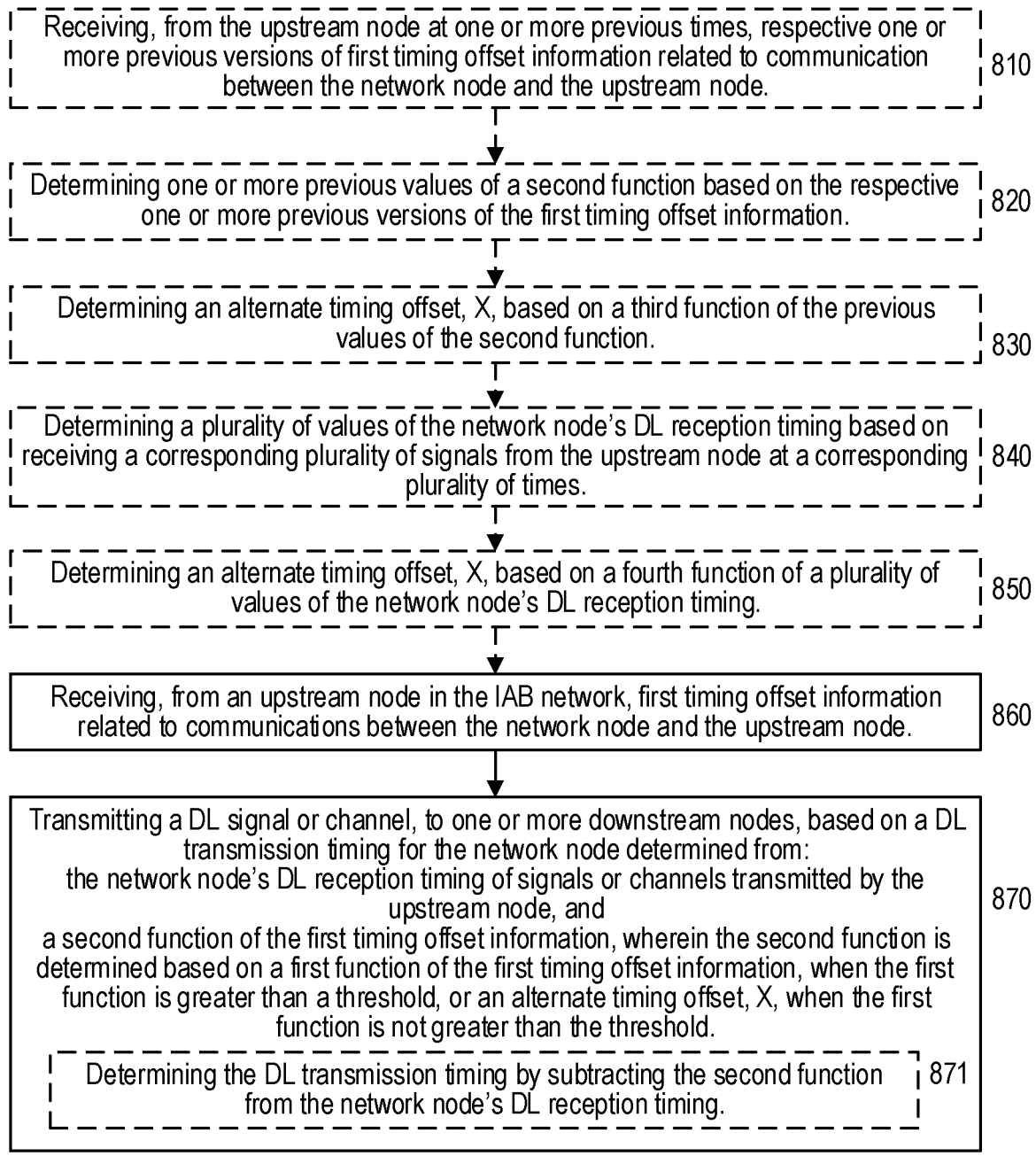
FIG. 8 illustrates an exemplary method (e.g., procedure) performed by network node in an integrated access backhaul (IAB) network, according to various exemplary embodiments of the present disclosure.

Although the exemplary method is illustrated in FIG. 8 by specific blocks in a particular order, the operations corresponding to exemplary method can be performed in a different order than shown, and can be combined and/or divided into blocks having different functionality than shown. Furthermore, the exemplary method shown in FIG. 8 can be complementary to other exemplary methods disclosed herein, such that they can be used cooperatively to provide benefits, advantages, and/or solutions to problems described herein. Optional blocks and/or operations are indicated by dashed lines.

The exemplary method can include the operations of block 860, where the network node can receive, from an upstream node in the IAB network, first timing offset information related to communications between the network node and the upstream node. The exemplary method can include the operations of block 870, where the network node can transmit a DL signal or channel, to one or more downstream nodes, based on a DL transmission timing for the network node determined from the network node's DL reception timing of signals or channels transmitted by the upstream node and a second function of the first timing offset information. The second function (e.g., T_hat_shift, discussed above) can be determined based on a first function of the first timing offset information, when the first function is greater than a threshold, or on an alternate timing offset (X) when the first function is not greater than the threshold. The one or more downstream nodes can be one or more UEs and/or child IAB nodes, as illustrated in FIGS. 3-4 and 7.

In some embodiments, the first timing offset information can include: a value (TΔ) based on the upstream node's DL transmission timing and the upstream node's UL reception timing; and a timing advance (TA) for the network node's UL transmission timing relative to the network node's DL reception timing with respect to the upstream node. For example, TΔ can represent a delay, offset, and/or difference between the upstream node's DL transmission timing and UL reception timing. In some embodiments, the first function of the first timing offset information can be TA/2+TΔ. In some embodiments, the threshold can be zero.

In some embodiments, the network node's DL reception timing and UL transmission timing can be associated with a mobile terminal (MT) portion of the network node, and the network node's DL transmission timing can be associated with a distributed unit (DU) portion of the network node. Examples of such arrangements are shown in FIGS. 4 and 7.

In some embodiments, the transmitting operations in block 870 can include the operations of sub-block 871, where the network node can determine the DL transmission timing (e.g., used for transmission in block 870) by subtracting the second function from the network node's DL reception timing. In some embodiments, the network node's DL transmission timing can be determined such that is substantially synchronized with the upstream node's DL transmission timing. For example, the network node can adjust the timing of the DL data transmission, according to the determined value, so as to align with a timeslot of a time-division duplexing (TDD) arrangement.

In some embodiments, the first timing offset can be received at a first time (e.g., time=n). In such embodiments, the exemplary method can also include the operations of blocks 810-820. In block 810, the network node can receive, from the upstream node at one or more previous times (e.g., times=n−1, n−2, etc.) before the first time, respective one or more previous versions of the first timing offset information (e.g., TA(n−1), TΔ(n−1), TA(n−2), TΔ(n−2), etc.). In block 820, the network node can determine one or more previous values of the second function (e.g., T_hat_shift(n−1), T_hat_shift(n−2), etc.) based on the respective one or more previous versions of the first timing offset information.

In various embodiments, the alternate timing offset (X) can be zero or a variable. The following describes certain embodiments where the alternate timing offset (s) is a variable determined based on various information.

In some embodiments, the exemplary method can also include the operations of block 830, where the network node can determine the alternate timing offset (X) based on a third function of the previous values of the second function (e.g., f(T_hat_shift(n−1), T_hat_shift(n−2), etc.)). In some embodiments, the third function can be a weighted average or a non-weighted average.

In other embodiments, the exemplary method can also include the operations of block 850, where the network node can determine the alternate timing offset (X) based on a fourth function of a plurality of values of the network node's DL reception timing. In some embodiments, the plurality of values of the network node's DL reception timing include a current timing value and a previous timing value. In such embodiments, the alternate timing offset (X) can be determined based on the current timing value, the previous timing value, and the most recent previous value of the second function. An example of such an operation is X(n)=(MT DL Rx(n) @ child)−(MT DL Rx(n−1) @ child)+T_hat_shift(n−1)), discussed above.

In some of these embodiments, the exemplary method can also include the operations of block 840, where the network node can determine the plurality of values of the network node's DL reception timing based on receiving a corresponding plurality of signals from the upstream node at a corresponding plurality of times.

Figure 9:
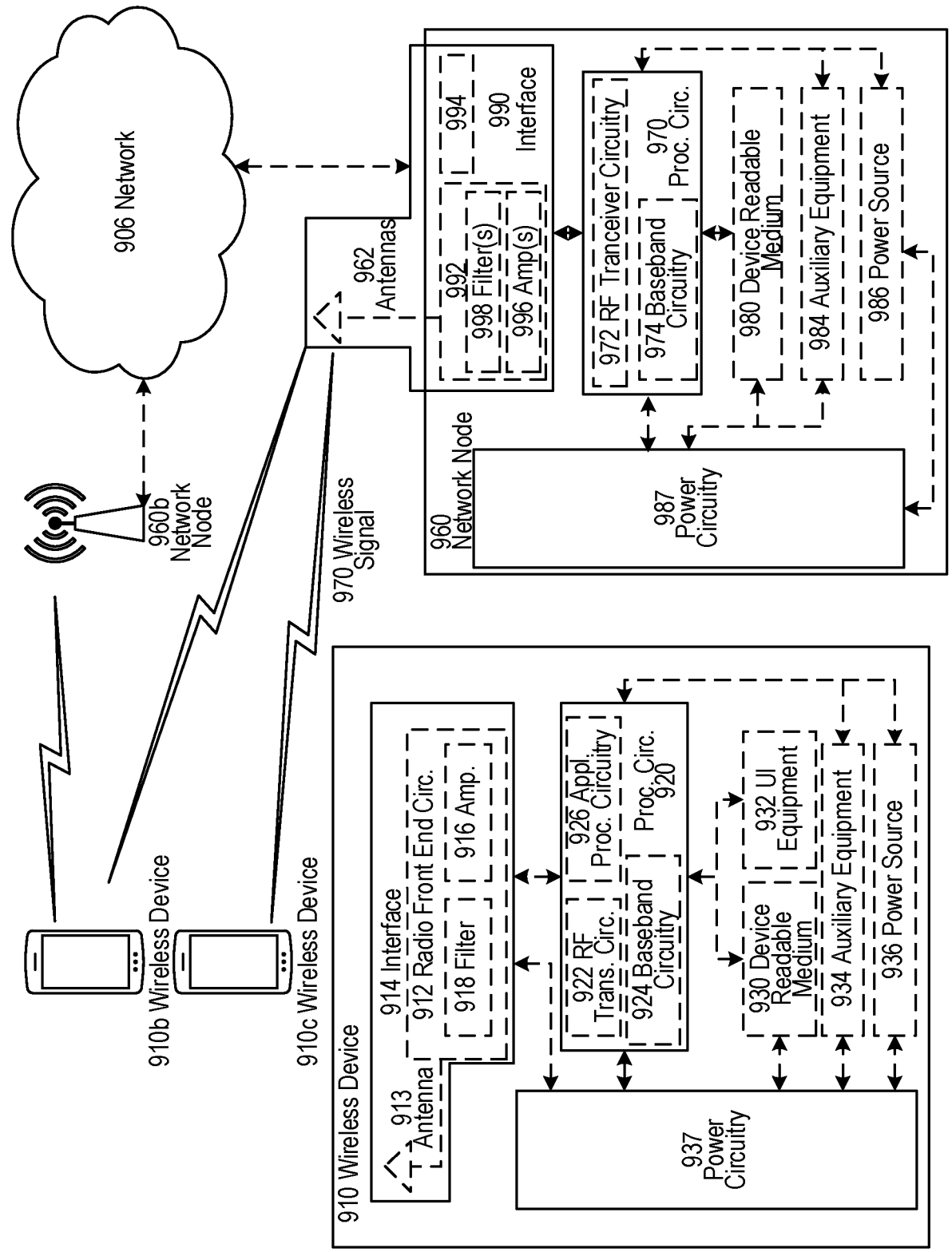
FIG. 9 illustrates an exemplary embodiment of a wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960*b*, and WDs 910, 910*b*, and 910*c*. In practice, a wireless network can further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 960 are depicted as single boxes located within a larger box, or nested within multiple boxes, in practice, a network node can comprise multiple different physical components that make up a single illustrated component (e.g., device readable medium 980 can comprise multiple separate hard drives as well as multiple RAM modules).

Similarly, network node 960 can be composed of multiple physically separate components (e.g., a NodeB component and a RNC component, or a BTS component and a BSC component, etc.), which can each have their own respective components. In certain scenarios in which network node 960 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 960 can be configured to support multiple radio access technologies (RATs). In such embodiments, some components can be duplicated (e.g., separate device readable medium 980 for the different RATs) and some components can be reused (e.g., the same antenna 962 can be shared by the RATs). Network node 960 can also include multiple sets of the various illustrated components for different wireless technologies integrated into network node 960, such as, for example, GSM, WCDMA, LTE, NR, WiFi, or Bluetooth wireless technologies. These wireless technologies can be integrated into the same or different chip or set of chips and other components within network node 960.

Processing circuitry 970 can be configured to perform any determining, calculating, or similar operations (e.g., certain obtaining operations) described herein as being provided by a network node. These operations performed by processing circuitry 970 can include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 960, either alone or in conjunction with other network node 960 components (e.g., device readable medium 980). Such functionality can include any of the various wireless features, functions, or benefits discussed herein.

For example, processing circuitry 970 can execute instructions stored in device readable medium 980 or in memory within processing circuitry 970. In some embodiments, processing circuitry 970 can include a system on a chip (SOC). As a more specific example, instructions (also referred to as a computer program product) stored in medium 980 can include instructions that, when executed by processing circuitry 970, can configure network node 960 to perform operations corresponding to various exemplary methods (e.g., procedures) described herein.

In some embodiments, processing circuitry 970 can include one or more of radio frequency (RF) transceiver circuitry 972 and baseband processing circuitry 974. In some embodiments, radio frequency (RF) transceiver circuitry 972 and baseband processing circuitry 974 can be on separate chips (or sets of chips), boards, or units, such as radio units and digital units. In alternative embodiments, part or all of RF transceiver circuitry 972 and baseband processing circuitry 974 can be on the same chip or set of chips, boards, or units In certain embodiments, some or all of the functionality described herein as being provided by a network node, base station, eNB or other such network device can be performed by processing circuitry 970 executing instructions stored on device readable medium 980 or memory within processing circuitry 970. In alternative embodiments, some or all of the functionality can be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 970. Device readable medium 980 can store any suitable instructions, data or information, including a computer program, software, an application including one or more of logic, rules, code, tables, etc. and/or other instructions capable of being executed by processing circuitry 970 and utilized by network node 960. Device readable medium 980 can be used to store any calculations made by processing circuitry 970 and/or any data received via interface 990. In some embodiments, processing circuitry 970 and device readable medium 980 can be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that can be coupled to, or in certain embodiments a part of, antenna 962. Radio front end circuitry 992 comprises filters 998 and amplifiers 996. Radio front end circuitry 992 can be connected to antenna 962 and processing circuitry 970. Radio front end circuitry can be configured to condition signals communicated between antenna 962 and processing circuitry 970. Radio front end circuitry 992 can receive digital data that is to be sent out to other network nodes or WDs via a wireless connection. Radio front end circuitry 992 can convert the digital data into a radio signal having the appropriate channel and bandwidth parameters using a combination of filters 998 and/or amplifiers 996. The radio signal can then be transmitted via antenna 962. Similarly, when receiving data, antenna 962 can collect radio signals which are then converted into digital data by radio front end circuitry 992. The digital data can be passed to processing circuitry 970. In other embodiments, the interface can comprise different components and/or different combinations of components.

In certain alternative embodiments, network node 960 may not include separate radio front end circuitry 992, instead, processing circuitry 970 can comprise radio front end circuitry and can be connected to antenna 962 without separate radio front end circuitry 992. Similarly, in some embodiments, all or some of RF transceiver circuitry 972 can be considered a part of interface 990. In still other embodiments, interface 990 can include one or more ports or terminals 994, radio front end circuitry 992, and RF transceiver circuitry 972, as part of a radio unit (not shown), and interface 990 can communicate with baseband processing circuitry 974, which is part of a digital unit (not shown).

Antenna 962 can include one or more antennas, or antenna arrays, configured to send and/or receive wireless signals. Antenna 962 can be coupled to radio front end circuitry 990 and can be any type of antenna capable of transmitting and receiving data and/or signals wirelessly. In some embodiments, antenna 962 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 962 can be separate from network node 960 and can be connectable to network node 960 through an interface or port.

Antenna 962, interface 990, and/or processing circuitry 970 can be configured to perform any receiving operations and/or certain obtaining operations described herein as being performed by a network node. Any information, data and/or signals can be received from a wireless device, another network node and/or any other network equipment. Similarly, antenna 962, interface 990, and/or processing circuitry 970 can be configured to perform any transmitting operations described herein as being performed by a network node. Any information, data and/or signals can be transmitted to a wireless device, another network node and/or any other network equipment.

Power circuitry 987 can comprise, or be coupled to, power management circuitry and can be configured to supply the components of network node 960 with power for performing the functionality described herein. Power circuitry 987 can receive power from power source 986. Power source 986 and/or power circuitry 987 can be configured to provide power to the various components of network node 960 in a form suitable for the respective components (e.g., at a voltage and current level needed for each respective component). Power source 986 can either be included in, or external to, power circuitry 987 and/or network node 960. For example, network node 960 can be connectable to an external power source (e.g., an electricity outlet) via an input circuitry or interface such as an electrical cable, whereby the external power source supplies power to power circuitry 987. As a further example, power source 986 can comprise a source of power in the form of a battery or battery pack which is connected to, or integrated in, power circuitry 987. The battery can provide backup power should the external power source fail. Other types of power sources, such as photovoltaic devices, can also be used.

Alternative embodiments of network node 960 can include additional components beyond those shown in FIG. 9 that can be responsible for providing certain aspects of the network node's functionality, including any of the functionality described herein and/or any functionality necessary to support the subject matter described herein. For example, network node 960 can include user interface equipment to allow and/or facilitate input of information into network node 960 and to allow and/or facilitate output of information from network node 960. This can allow and/or facilitate a user to perform diagnostic, maintenance, repair, and other administrative functions for network node 960.

In some embodiments, a wireless device (WD, e.g., WD 910) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation.

A WD as described above can represent the endpoint of a wireless connection, in which case the device can be referred to as a wireless terminal. Furthermore, a WD as described above can be mobile, in which case it can also be referred to as a mobile device or a mobile terminal. As illustrated, wireless device 910 includes antenna 911, interface 914, processing circuitry 920, device readable medium 930, user interface equipment 932, auxiliary equipment 934, power source 936 and power circuitry 937. WD 910 can include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies can be integrated into the same or different chips or set of chips as other components within WD 910.

Antenna 911 can include one or more antennas or antenna arrays, configured to send and/or receive wireless signals, and is connected to interface 914. In certain alternative embodiments, antenna 911 can be separate from WD 910 and be connectable to WD 910 through an interface or port. Antenna 911, interface 914, and/or processing circuitry 920 can be configured to perform any receiving or transmitting operations described herein as being performed by a WD. Any information, data and/or signals can be received from a network node and/or another WD. In some embodiments, radio front end circuitry and/or antenna 911 can be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and can be configured to condition signals communicated between antenna 911 and processing circuitry 920. Radio front end circuitry 912 can be coupled to or a part of antenna 911. In some embodiments, WD 910 may not include separate radio front end circuitry 912; rather, processing circuitry 920 can comprise radio front end circuitry and can be connected to antenna 911. Similarly, in some embodiments, some or all of RF transceiver circuitry 922 can be considered a part of interface 914. Radio front end circuitry 912 can receive digital data that is to be sent out to other network nodes or WDs via a wireless connection. Radio front end circuitry 912 can convert the digital data into a radio signal having the appropriate channel and bandwidth parameters using a combination of filters 918 and/or amplifiers 916. The radio signal can then be transmitted via antenna 911. Similarly, when receiving data, antenna 911 can collect radio signals which are then converted into digital data by radio front end circuitry 912. The digital data can be passed to processing circuitry 920. In other embodiments, the interface can comprise different components and/or different combinations of components.

Processing circuitry 920 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 910 functionality either alone or in combination with other WD 910 components, such as device readable medium 930. Such functionality can include any of the various wireless features or benefits discussed herein.

For example, processing circuitry 920 can execute instructions stored in device readable medium 930 or in memory within processing circuitry 920 to provide the functionality disclosed herein. More specifically, instructions (also referred to as a computer program product) stored in medium 930 can include instructions that, when executed by processor 920, can configure wireless device 910 to perform operations corresponding to various exemplary methods (e.g., procedures) described herein.

As illustrated, processing circuitry 920 can include one or more of RF transceiver circuitry 922, baseband processing circuitry 924, and application processing circuitry 926. In other embodiments, the processing circuitry can comprise different components and/or different combinations of components. In certain embodiments processing circuitry 920 of WD 910 can comprise a SOC. In some embodiments, RF transceiver circuitry 922, baseband processing circuitry 924, and application processing circuitry 926 can be on separate chips or sets of chips. In alternative embodiments, part or all of baseband processing circuitry 924 and application processing circuitry 926 can be combined into one chip or set of chips, and RF transceiver circuitry 922 can be on a separate chip or set of chips. In still alternative embodiments, part or all of RF transceiver circuitry 922 and baseband processing circuitry 924 can be on the same chip or set of chips, and application processing circuitry 926 can be on a separate chip or set of chips. In yet other alternative embodiments, part or all of RF transceiver circuitry 922, baseband processing circuitry 924, and application processing circuitry 926 can be combined in the same chip or set of chips. In some embodiments, RF transceiver circuitry 922 can be a part of interface 914. RF transceiver circuitry 922 can condition RF signals for processing circuitry 920.

In certain embodiments, some or all of the functionality described herein as being performed by a WD can be provided by processing circuitry 920 executing instructions stored on device readable medium 930, which in certain embodiments can be a computer-readable storage medium. In alternative embodiments, some or all of the functionality can be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 can be configured to perform any determining, calculating, or similar operations (e.g., certain obtaining operations) described herein as being performed by a WD. These operations, as performed by processing circuitry 920, can include processing information obtained by processing circuitry 920 by, for example, converting the obtained information into other information, comparing the obtained information or converted information to information stored by WD 910, and/or performing one or more operations based on the obtained information or converted information, and as a result of said processing making a determination. Device readable medium 930 can be operable to store a computer program, software, an application including one or more of logic, rules, code, tables, etc. and/or other instructions capable of being executed by processing circuitry 920. Device readable medium 930 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 920. In some embodiments, processing circuitry 920 and device readable medium 930 can be considered to be integrated.

User interface equipment 932 can include components that allow and/or facilitate a human user to interact with WD 910. Such interaction can be of many forms, such as visual, audial, tactile, etc. User interface equipment 932 can be operable to produce output to the user and to allow and/or facilitate the user to provide input to WD 910. The type of interaction can vary depending on the type of user interface equipment 932 installed in WD 910. For example, if WD 910 is a smart phone, the interaction can be via a touch screen; if WD 910 is a smart meter, the interaction can be through a screen that provides usage (e.g., the number of gallons used) or a speaker that provides an audible alert (e.g., if smoke is detected). User interface equipment 932 can include input interfaces, devices and circuits, and output interfaces, devices and circuits. User interface equipment 932 can be configured to allow and/or facilitate input of information into WD 910, and is connected to processing circuitry 920 to allow and/or facilitate processing circuitry 920 to process the input information. User interface equipment 932 can include, for example, a microphone, a proximity or other sensor, keys/buttons, a touch display, one or more cameras, a USB port, or other input circuitry. User interface equipment 932 is also configured to allow and/or facilitate output of information from WD 910, and to allow and/or facilitate processing circuitry 920 to output information from WD 910. User interface equipment 932 can include, for example, a speaker, a display, vibrating circuitry, a USB port, a headphone interface, or other output circuitry. Using one or more input and output interfaces, devices, and circuits, of user interface equipment 932, WD 910 can communicate with end users and/or the wireless network, and allow and/or facilitate them to benefit from the functionality described herein.

Auxiliary equipment 934 is operable to provide more specific functionality which may not be generally performed by WDs. This can comprise specialized sensors for doing measurements for various purposes, interfaces for additional types of communication such as wired communications etc. The inclusion and type of components of auxiliary equipment 934 can vary depending on the embodiment and/or scenario.

Power source 936 can, in some embodiments, be in the form of a battery or battery pack. Other types of power sources, such as an external power source (e.g., an electricity outlet), photovoltaic devices or power cells, can also be used. WD 910 can further comprise power circuitry 937 for delivering power from power source 936 to the various parts of WD 910 which need power from power source 936 to carry out any functionality described or indicated herein. Power circuitry 937 can in certain embodiments comprise power management circuitry. Power circuitry 937 can additionally or alternatively be operable to receive power from an external power source; in which case WD 910 can be connectable to the external power source (such as an electricity outlet) via input circuitry or an interface such as an electrical power cable. Power circuitry 937 can also in certain embodiments be operable to deliver power from an external power source to power source 936. This can be, for example, for the charging of power source 936. Power circuitry 937 can perform any converting or other modification to the power from power source 936 to make it suitable for supply to the respective components of WD 910.

Figure 10:
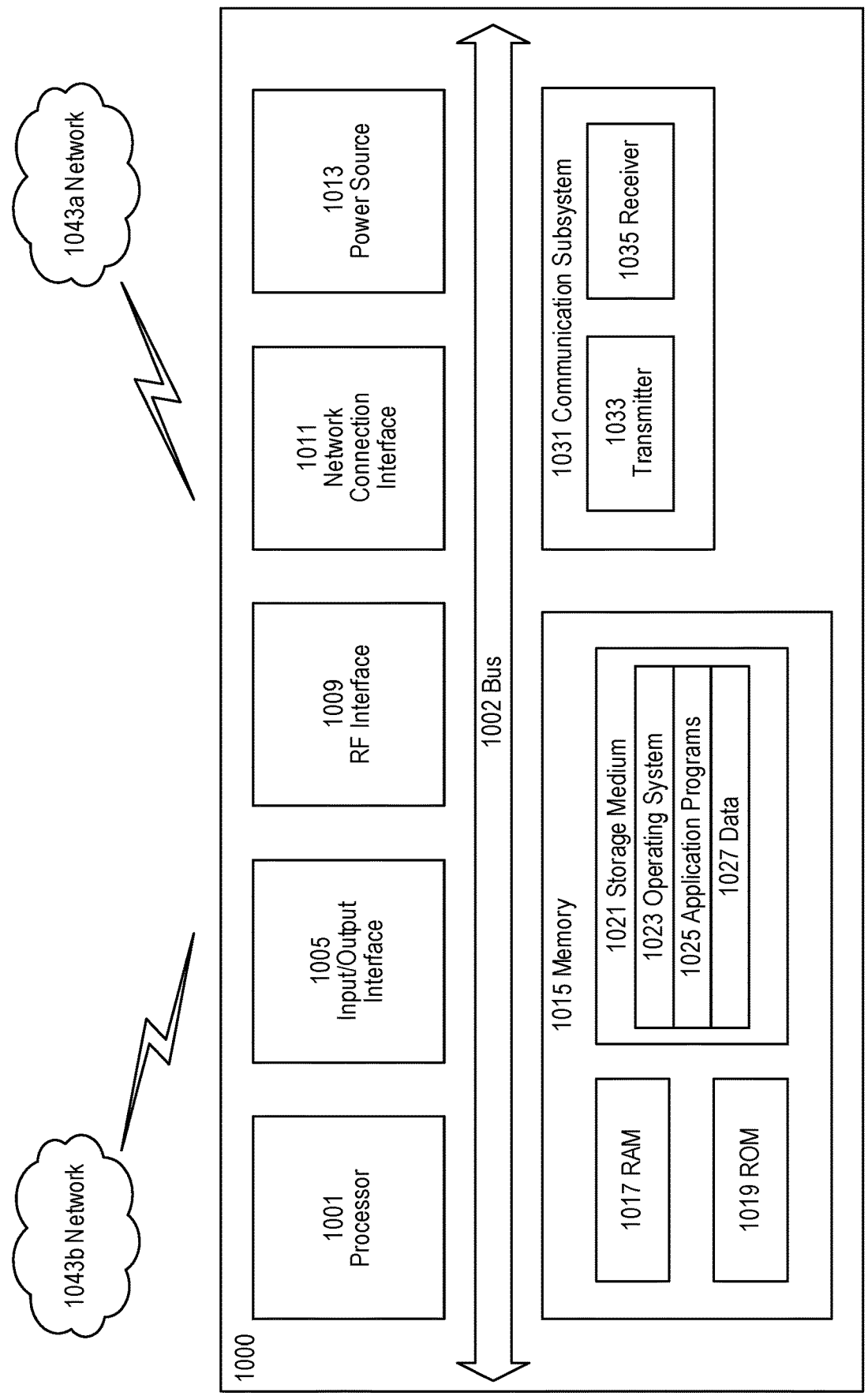
FIG. 10 illustrates an exemplary embodiment of a UE, according to various exemplary embodiments of the present disclosure.

FIG. 10 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 10200 can be any UE identified by the 3$^{rd}$ Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE can be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 can include other similar types of information. Certain UEs can utilize all of the components shown in FIG. 10, or only a subset of the components. The level of integration between the components can vary from one UE to another UE. Further, certain UEs can contain multiple instances of a component, such as multiple processors, memories, transceivers, transmitters, receivers, etc.

In FIG. 10, processing circuitry 1001 can be configured to process computer instructions and data. Processing circuitry 1001 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 can include two central processing units (CPUs). Data can be information in a form suitable for use by a computer.

In the depicted embodiment, input/output interface 1005 can be configured to provide a communication interface to an input device, output device, or input and output device. UE 1000 can be configured to use an output device via input/output interface 1005. An output device can use the same type of interface port as an input device. For example, a USB port can be used to provide input to and output from UE 1000. The output device can be a speaker, a sound card, a video card, a display, a monitor, a printer, an actuator, an emitter, a smartcard, another output device, or any combination thereof. UE 1000 can be configured to use an input device via input/output interface 1005 to allow and/or facilitate a user to capture information into UE 1000. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 10, RF interface 1009 can be configured to provide a communication interface to RF components such as a transmitter, a receiver, and an antenna. Network connection interface 1011 can be configured to provide a communication interface to network 1043a. Network 1043a can encompass wired and/or wireless networks such as a local-area network (LAN), a wide-area network (WAN), a computer network, a wireless network, a telecommunications network, another like network or any combination thereof. For example, network 1043a can comprise a WiFi network. Network connection interface 1011 can be configured to include a receiver and a transmitter interface used to communicate with one or more other devices over a communication network according to one or more communication protocols, such as Ethernet, TCP/IP, SONET, ATM, or the like. Network connection interface 1011 can implement receiver and transmitter functionality appropriate to the communication network links (e.g., optical, electrical, and the like). The transmitter and receiver functions can share circuit components, software or firmware, or alternatively can be implemented separately.

RAM 1017 can be configured to interface via bus 1002 to processing circuitry 1001 to provide storage or caching of data or computer instructions during the execution of software programs such as the operating system, application programs, and device drivers. ROM 1019 can be configured to provide computer instructions or data to processing circuitry 1001. For example, ROM 1019 can be configured to store invariant low-level system code or data for basic system functions such as basic input and output (I/O), startup, or reception of keystrokes from a keyboard that are stored in a non-volatile memory. Storage medium 1021 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1021 can be configured to include operating system 1023; application program 1025 such as a web browser application, a widget or gadget engine or another application; and data file 1027. Storage medium 1021 can store, for use by UE 1000, any of a variety of various operating systems or combinations of operating systems. For example, application program 1025 can include executable program instructions (also referred to as a computer program product) that, when executed by processor 1001, can configure UE 1000 to perform operations corresponding to various exemplary methods (e.g., procedures) described herein.

Storage medium 1021 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 can allow and/or facilitate UE 1000 to access computer-executable instructions, application programs or the like, stored on transitory or non-transitory memory media, to off-load data, or to upload data. An article of manufacture, such as one utilizing a communication system can be tangibly embodied in storage medium 1021, which can comprise a device readable medium.

In FIG. 10, processing circuitry 1001 can be configured to communicate with network 1043*b* using communication subsystem 1031. Network 1043*a* and network 1043*b* can be the same network or networks or different network or networks. Communication subsystem 1031 can be configured to include one or more transceivers used to communicate with network 1043*b*. For example, communication subsystem 1031 can be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver can include transmitter 1033 and/or receiver 1035 to implement transmitter or receiver functionality, respectively, appropriate to the RAN links (e.g., frequency allocations and the like). Further, transmitter 1033 and receiver 1035 of each transceiver can share circuit components, software or firmware, or alternatively can be implemented separately.

In the illustrated embodiment, the communication functions of communication subsystem 1031 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 can include cellular communication, Wi-Fi communication, Bluetooth communication, and GPS communication. Network 1043*b* can encompass wired and/or wireless networks such as a local-area network (LAN), a wide-area network (WAN), a computer network, a wireless network, a telecommunications network, another like network or any combination thereof. For example, network 1043*b* can be a cellular network, a Wi-Fi network, and/or a near-field network. Power source 1013 can be configured to provide alternating current (AC) or direct current (DC) power to components of UE 1000.

The features, benefits and/or functions described herein can be implemented in one of the components of UE 1000 or partitioned across multiple components of UE 1000. Further, the features, benefits, and/or functions described herein can be implemented in any combination of hardware, software or firmware. In one example, communication subsystem 1031 can be configured to include any of the components described herein. Further, processing circuitry 1001 can be configured to communicate with any of such components over bus 1002. In another example, any of such components can be represented by program instructions stored in memory that when executed by processing circuitry 1001 perform the corresponding functions described herein. In another example, the functionality of any of such components can be partitioned between processing circuitry 1001 and communication subsystem 1031. In another example, the non-computationally intensive functions of any of such components can be implemented in software or firmware and the computationally intensive functions can be implemented in hardware.

Figure 11:
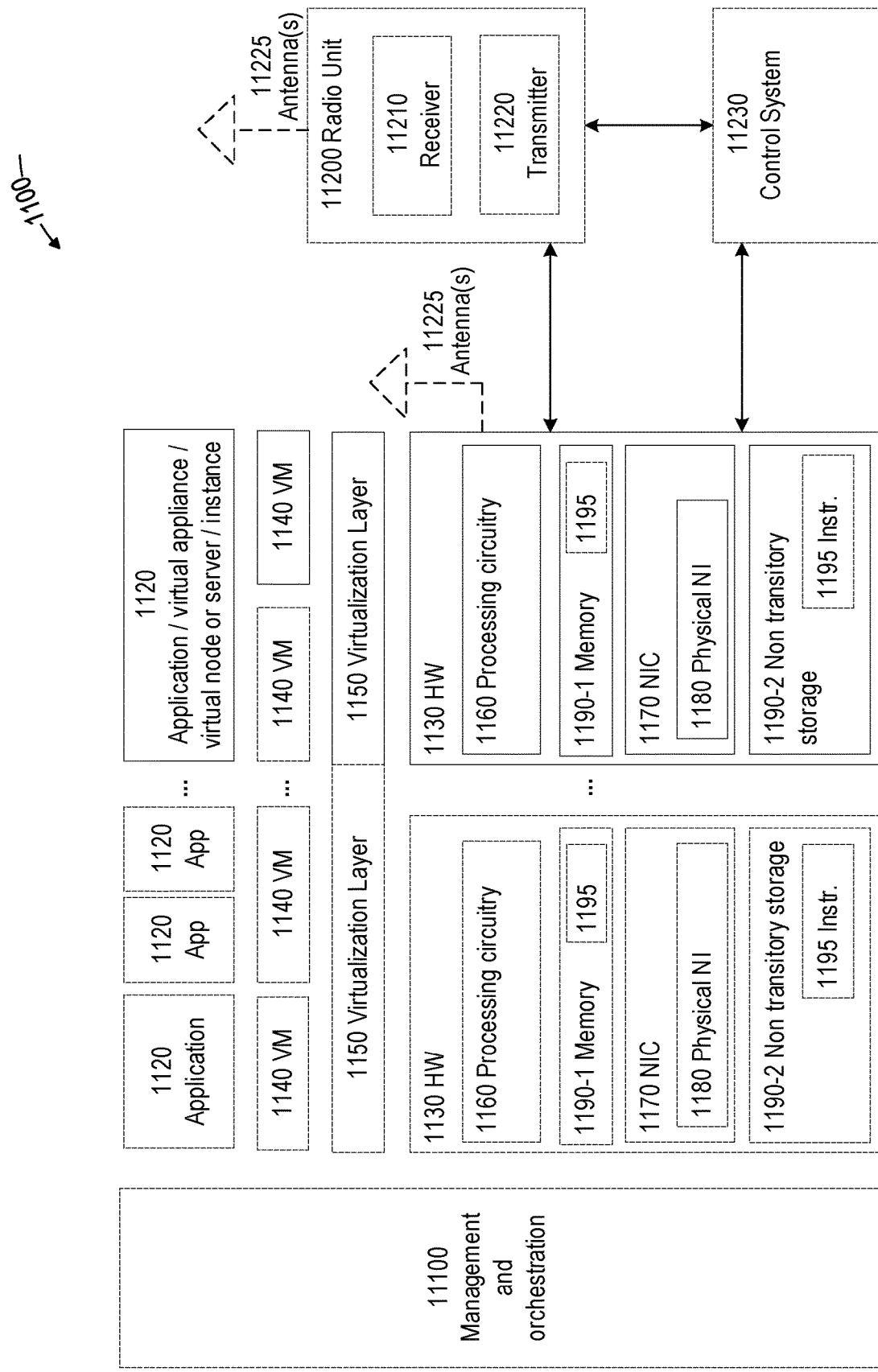
FIG. 11 is a block diagram illustrating an exemplary virtualization environment usable for implementation of various exemplary embodiments of the present disclosure.

FIG. 11 is a schematic block diagram illustrating a virtualization environment 1100 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node can be entirely virtualized.

The functions can be implemented by one or more applications 1120 (which can alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100 can include general-purpose or special-purpose network hardware devices (or nodes) 1130 comprising a set of one or more processors or processing circuitry 1160, which can be commercial off-the-shelf (COTS) processors, dedicated Application Specific Integrated Circuits (ASICs), or any other type of processing circuitry including digital or analog hardware components or special purpose processors. Each hardware device can comprise memory 1190-1 which can be non-persistent memory for temporarily storing instructions 1195 or software executed by processing circuitry 1160. For example, instructions 1195 can include program instructions (also referred to as a computer program product) that, when executed by processing circuitry 1160, can configure hardware node 1120 to perform operations corresponding to various exemplary methods (e.g., procedures) described herein. Such operations can also be attributed to virtual node(s) 1120 that is/are hosted by hardware node 1130.

Each hardware device can comprise one or more network interface controllers (NICs) 1170, also known as network interface cards, which include physical network interface 1180. Each hardware device can also include non-transitory, persistent, machine-readable storage media 1190-2 having stored therein software 1195 and/or instructions executable by processing circuitry 1160. Software 1195 can include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and can be run by a corresponding virtualization layer 1150 or hypervisor. Different embodiments of the instance of virtual appliance 1120 can be implemented on one or more of virtual machines 1140, and the implementations can be made in different ways.

During operation, processing circuitry 1160 executes software 1195 to instantiate the hypervisor or virtualization layer 1150, which can sometimes be referred to as a virtual machine monitor (VMM). Virtualization layer 1150 can present a virtual operating platform that appears like networking hardware to virtual machine 1140.

As shown in FIG. 11, hardware 1130 can be a standalone network node with generic or specific components. Hardware 1130 can comprise antenna 11225 and can implement some functions via virtualization. Alternatively, hardware 1130 can be part of a larger cluster of hardware (e.g., such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1140 can be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 can be coupled to one or more antennas 11225. Radio units 11200 can communicate directly with hardware nodes 1130 via one or more appropriate network interfaces and can be used in combination with the virtual components to provide a virtual node with radio capabilities, such as a radio access node or a base station.

In some embodiments, some signalling can be effected with the use of control system 11230 which can alternatively be used for communication between the hardware nodes 1130 and radio units 11200.

Figure 12:
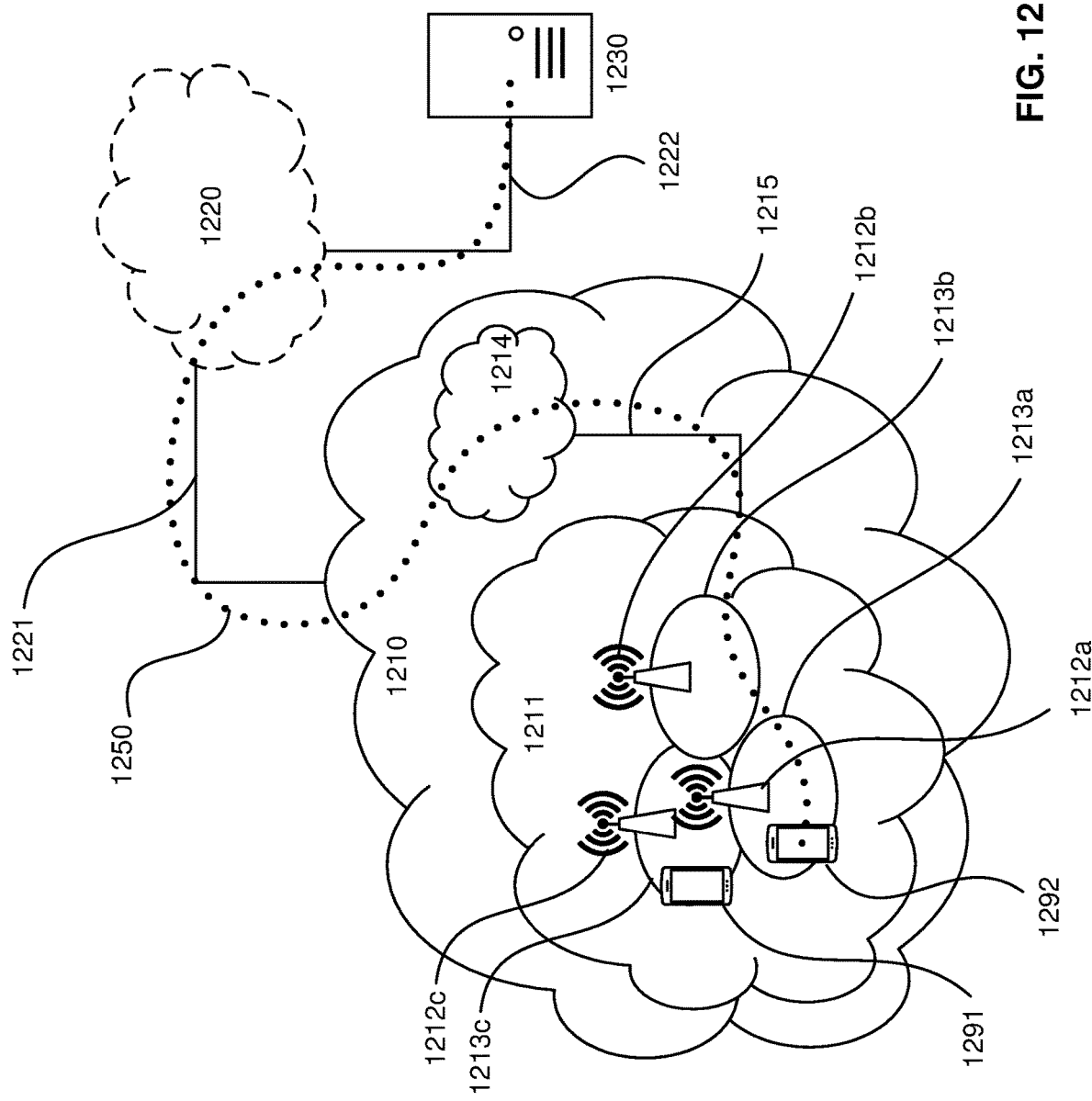
FIGS. 12-13 are block diagrams of various exemplary communication systems and/or networks, according to various exemplary embodiments of the present disclosure.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212*a*, 1212*b*, 1212*c*, such as NBs, eNBs, gNBs or other types of wireless access points, each defining a corresponding coverage area 1213*a*, 1213*b*, 1213*c*. Each base station 1212*a*, 1212*b*, 1212*c* is connectable to core network 1214 over a wired or wireless connection 1215. A first UE 1291 located in coverage area 1213*c* can be configured to wirelessly connect to, or be paged by, the corresponding base station 1212*c*. A second UE 1292 in coverage area 1213*a* is wirelessly connectable to the corresponding base station 1212*a*. While a plurality of UEs 1291, 1292 are illustrated in this example, the disclosed embodiments are equally applicable to a situation where a sole UE is in the coverage area or where a sole UE is connecting to the Telecommunication network 1210 is itself connected to host computer 1230, which can be embodied in the hardware and/or software of a standalone server, a cloud-implemented server, a distributed server or as processing resources in a server farm. Host computer 1230 can be under the ownership or control of a service provider, or can be operated by the service provider or on behalf of the service provider. Connections 1221 and 1222 between telecommunication network 1210 and host computer 1230 can extend directly from core network 1214 to host computer 1230 or can go via an optional intermediate network 1220. Intermediate network 1220 can be one of, or a combination of more than one of, a public, private or hosted network; intermediate network 1220, if any, can be a backbone network or the Internet; in particular, intermediate network 1220 can comprise two or more sub-networks (not shown).

The communication system of FIG. 12 as a whole enables connectivity between the connected UEs 1291, 1292 and host computer 1230. The connectivity can be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 can be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which can have storage and/or processing capabilities. In particular, processing circuitry 1318 can comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 can be operable to provide a service to a remote user, such as UE 1330 connecting via OTT connection 1350 terminating at UE 1330 and host computer 1310. In providing the service to the remote user, host application 1312 can provide user data which is transmitted using OTT connection 1350.

Communication system 1300 can also include base station 1320 provided in a telecommunication system and comprising hardware 1325 enabling it to communicate with host computer 1310 and with UE 1330. Hardware 1325 can include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 can be configured to facilitate connection 1360 to host computer 1310. Connection 1360 can be direct, or it can pass through a core network (not shown in FIG. 13) of the telecommunication system and/or through one or more intermediate networks outside the telecommunication system. In the embodiment shown, hardware 1325 of base station 1320 can also include processing circuitry 1328, which can comprise one or more programmable processors, application-specific integrated circuits, field programmable gate arrays or combinations of these (not shown) adapted to execute instructions.

Base station 1320 also includes software 1321 stored internally or accessible via an external connection. For example, software 1321 can include program instructions (also referred to as a computer program product) that, when executed by processing circuitry 1328, can configure base station 1320 to perform operations corresponding to various exemplary methods (e.g., procedures) described herein.

Communication system 1300 can also include UE 1330 already referred to, whose hardware 1335 can include radio interface 1337 configured to set up and maintain wireless connection 1370 with a base station serving a coverage area in which UE 1330 is currently located. Hardware 1335 of UE 1330 can also include processing circuitry 1338, which can comprise one or more programmable processors, application-specific integrated circuits, field programmable gate arrays or combinations of these (not shown) adapted to execute instructions.

UE 1330 also includes software 1331, which is stored in or accessible by UE 1330 and executable by processing circuitry 1338. Software 1331 includes client application 1332. Client application 1332 can be operable to provide a service to a human or non-human user via UE 1330, with the support of host computer 1310. In host computer 1310, an executing host application 1312 can communicate with the executing client application 1332 via OTT connection 1350 terminating at UE 1330 and host computer 1310. In providing the service to the user, client application 1332 can receive request data from host application 1312 and provide user data in response to the request data. OTT connection 1350 can transfer both the request data and the user data. Client application 1332 can interact with the user to generate the user data that it provides. Software 1331 can also include program instructions (also referred to as a computer program product) that, when executed by processing circuitry 1338, can configure UE 1330 to perform operations corresponding to various exemplary methods (e.g., procedures) described herein.

Figure 13:
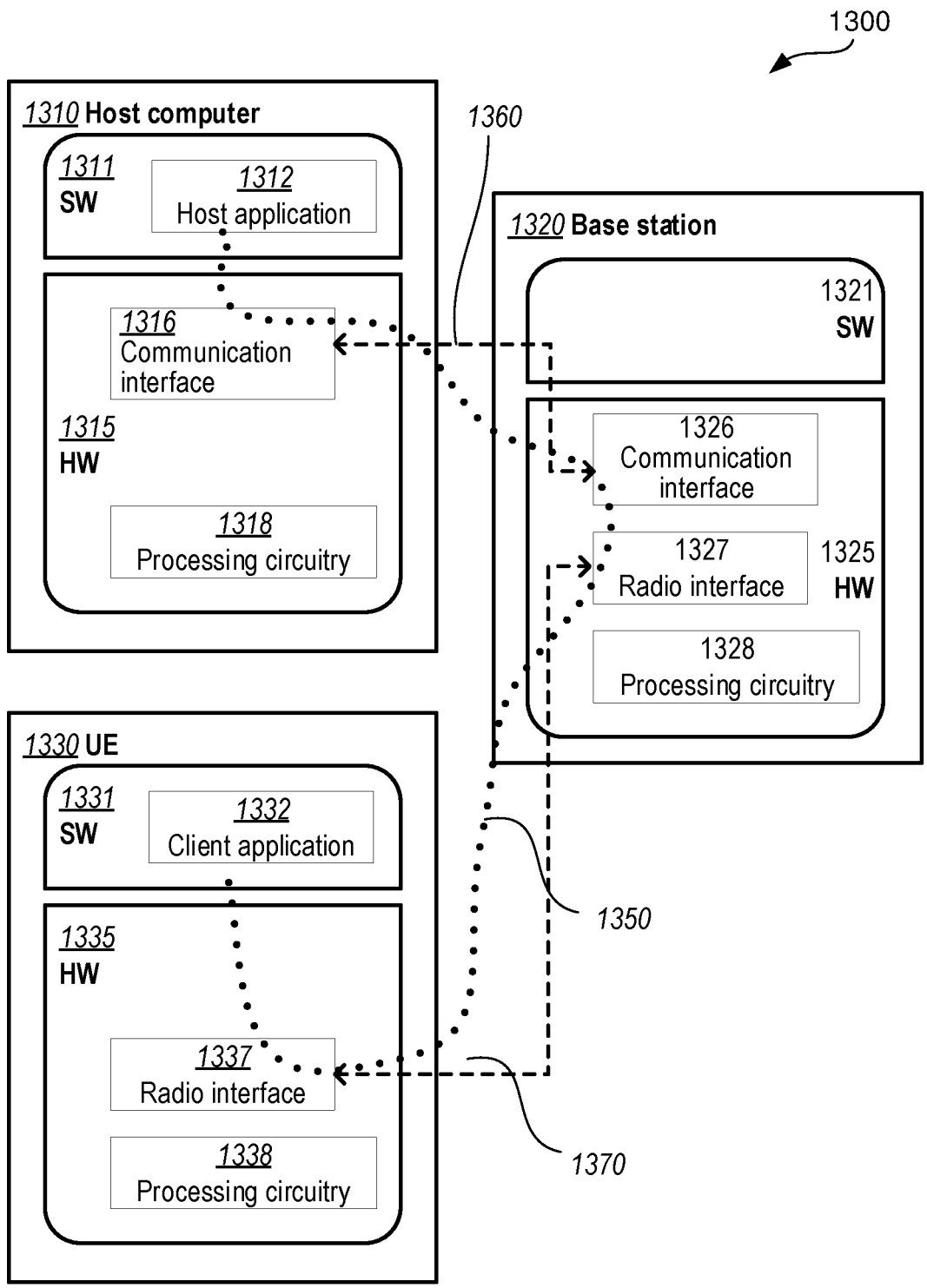

It is noted that host computer 1310, base station 1320 and UE 1330 illustrated in FIG. 13 can be similar or identical to host computer 1230, one of base stations 1212*a*, 1212*b*, 1212*c* and one of UEs 1291, 1292 of FIG. 12, respectively. This is to say, the inner workings of these entities can be as shown in FIG. 13 and independently, the surrounding network topology can be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure can determine the routing, which it can be configured to hide from UE 1330 or from the service provider operating host computer 1310, or both. While OTT connection 1350 is active, the network infrastructure can further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1350 between host computer 1310 and UE 1330, in response to variations in the measurement results. The measurement procedure and/or the network functionality for reconfiguring OTT connection 1350 can be implemented in software 1311 and hardware 1315 of host computer 1310 or in software 1331 and hardware 1335 of UE 1330, or both. In embodiments, sensors (not shown) can be deployed in or in association with communication devices through which OTT connection 1350 passes; the sensors can participate in the measurement procedure by supplying values of the monitored quantities exemplified above, or supplying values of other physical quantities from which software 1311, 1331 can compute or estimate the monitored quantities. The reconfiguring of OTT connection 1350 can include message format, retransmission settings, preferred routing etc.; the reconfiguring need not affect base station 1320, and it can be unknown or imperceptible to base station 1320. Such procedures and functionalities can be known and practiced in the art. In certain embodiments, measurements can involve proprietary UE signaling facilitating host computer 1310's measurements of throughput, propagation times, latency and the like. The measurements can be implemented in that software 1311 and 1331 causes messages to be transmitted, in particular empty or 'dummy' messages, using OTT connection 1350 while it monitors propagation times, errors etc.

FIG. 14 is a flowchart illustrating an exemplary method implemented in a communication system, in accordance with one embodiment. The communication system includes a host computer, a base station and a UE which, in some exemplary embodiments, can be those described with reference to FIGS. 12 and 13. For simplicity of the present disclosure, only drawing references to FIG. 14 will be included in this section. In step 1410, the host computer provides user data. In substep 1411 (which can be optional) of step 1410, the host computer provides the user data by executing a host application. In step 1420, the host computer initiates a transmission carrying the user data to the UE. In step 1430 (which can be optional), the base station transmits to the UE the user data which was carried in the transmission that the host computer initiated, in accordance with the teachings of the embodiments described throughout this disclosure. In step 1440 (which can also be optional), the UE executes a client application associated with the host application executed by the host computer.

FIG. 15 is a flowchart illustrating an exemplary method implemented in a communication system, in accordance with one embodiment. The communication system includes a host computer, a base station and a UE which can be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission can pass via the base station, in accordance with the teachings of the embodiments described throughout this disclosure. In step 1530 (which can be optional), the UE receives the user data carried in the transmission.

FIG. 16 is a flowchart illustrating an exemplary method implemented in a communication system, in accordance with one embodiment. The communication system includes a host computer, a base station and a UE which can be those described with reference to FIGS. 12 and 13. For simplicity of the present disclosure, only drawing references to FIG. 16 will be included in this section. In step 1610 (which can be optional), the UE receives input data provided by the host computer. Additionally or alternatively, in step 1620, the UE provides user data. In substep 1621 (which can be optional) of step 1620, the UE provides the user data by executing a client application. In substep 1611 (which can be optional) of step 1610, the UE executes a client application which provides the user data in reaction to the received input data provided by the host computer. In providing the user data, the executed client application can further consider user input received from the user. Regardless of the specific manner in which the user data was provided, the UE initiates, in substep 1630 (which can be optional), transmission of the user data to the host computer. In step 1640 of the method, the host computer receives the user data transmitted from the UE, in accordance with the teachings of the embodiments described throughout this disclosure.

FIG. 17 is a flowchart illustrating an exemplary method implemented in a communication system, in accordance with one embodiment. The communication system includes a host computer, a base station and a UE which can be those described with reference to FIGS. 12 and 13. For simplicity of the present disclosure, only drawing references to FIG. 17 will be included in this section. In step 1710 (which can be optional), in accordance with the teachings of the embodiments described throughout this disclosure, the base station receives user data from the UE. In step 1720 (which can be optional), the base station initiates transmission of the received user data to the host computer. In step 1730 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated examples:

1. A method, performed by a network node in an integrated access backhaul (IAB) network, for adjusting downlink (DL) transmission timing of the network node, the method comprising:
   determining DL reception timing of a DL signal received from an upstream node in the IAB network;
   receiving, from the upstream node, first timing offset information comprising:
      a difference (TΔ) between the upstream node's DL transmission timing and the upstream node's UL reception timing, and
      a timing advance (TA) for the network node's UL transmission timing relative to the DL reception timing;
   determining the network node's DL transmission timing based on the DL reception timing and further based on one of the following:
      a function of the first timing offset information, based on determining that the function is greater than a threshold, or
      an alternate timing offset, X, based on determining that the function is not greater than the threshold.
2. The method of claim 1, wherein determining the network node's DL transmission timing comprises subtracting one of the following from the DL reception timing: the function of the first timing offset information, or the alternate timing offset, X.
3. The method of any of claims 1-2, wherein the function of the first timing offset information is TA/2+TΔ.
4. The method of any of claims 1-3, wherein the threshold is zero.
5. The method of any of claims 1-4, wherein X is zero.
6. The method of any of claims 1-4, wherein X is a variable
7. The method of claim 6, wherein X is determined based on a function of one or more previously determined DL reception timing values.
8. The method of any of claims 6-7, wherein X is determined based on the DL reception timing, the most recent previously determined DL reception timing value, and a previously received first timing offset information.
9. The method of any of claims 1-8, wherein:
   the DL reception timing and the UL transmission timing are associated with a mobile terminal (MT) comprising the network node; and
   the DL transmission timing is associated with a distributed unit (DU) comprising the network node.
10. The method of any of claims 1-9, wherein the determined DL transmission timing is substantially synchronized with the upstream node's DL transmission timing.
11. The method of any of claims 1-10, further comprising, performing a DL transmission of data according the determined DL transmission timing.
12. A network node in an integrated access backhaul (IAB) network configured to adjust downlink (DL) transmission timing based on information provided by an upstream node in the TAB network, the network node comprising:
   radio transceiver circuitry configured to communicate with the upstream node and one or more downstream nodes in the TAB network; and
   processing circuitry operably coupled to the radio transceiver circuitry and configured to perform operations corresponding to any of the methods of claims 1-11; and
   power supply circuitry configured to supply power to the node.
13. An integrated access backhaul (IAB) network comprising:
   the network node of claim 12; and
   an upstream network node including processing circuitry and radio transceiver circuitry, whereby the upstream network node is configured to communicate with the network node.
14. The IAB network of claim 13, further comprising a downstream network node including processing circuitry and radio transceiver circuitry, whereby the downstream network node is configured to communicate with the network node.
15. A non-transitory, computer-readable medium storing computer-executable instructions that, when executed by processing circuitry comprising a network node in an integrated access backhaul (IAB) network, configure the network node to perform operations corresponding to any of the methods of claims 1-11.
16. A computer program product comprising computer-executable instructions that, when executed by processing circuitry comprising a network node in an integrated access backhaul (IAB) network, configure the network node to perform operations corresponding to any of the methods of claims 1-11.

The invention claimed is:

1. A method for downlink (DL) transmission by a network node in an integrated access backhaul (IAB) network, the method comprising:
   receiving, from an upstream node in the IAB network, first timing offset information related to communications between the network node and the upstream node; and
   transmitting a DL signal or channel, to one or more downstream nodes, based on a DL transmission timing for the network node determined from the following:

the network node's DL reception timing of signals or channels transmitted by the upstream node; and
a second timing value determined based on:
a first timing value determined from the first timing offset information based on a first mathematical function, when the first timing value is greater than a threshold; and
an alternate timing offset (X) not determined from the first timing offset information, when the first timing value is not greater than the threshold.

2. The method of claim 1, wherein the first timing offset information comprises:
a value (TΔ) based on the upstream node's DL transmission timing and the upstream node's uplink (UL) reception timing; and
a timing advance (TA) for the network node's UL transmission timing relative to the network node's DL reception timing with respect to the upstream node.

3. The method of claim 2, wherein the first mathematical function of the first timing offset information is TA/2+TΔ.

4. The method of claim 1, wherein transmitting the DL signal or channel comprises determining the network node's DL transmission timing by subtracting the second timing value from the network node's DL reception timing.

5. The method of claim 1, wherein one or more of the following applies:
the threshold is zero; and
the alternate timing offset (X) is one of the following: zero or a variable.

6. The method of claim 1, wherein:
the first timing offset information is received at a first time; and
the method further comprises:
receiving, from the upstream node at one or more previous times before the first time, respective one or more previous versions of the first timing offset information; and
determining one or more previous second timing values based on the respective one or more previous versions of the first timing offset information and the alternate timing offset (X).

7. The method of claim 6, further comprising determining the alternate timing offset (X) based on one of the following:
a third function of the previous second timing values; or
a fourth function of a plurality of values of the network node's DL reception timing.

8. The method of claim 7, wherein the third function is a weighted average or a non-weighted average.

9. The method of claim 7, wherein:
the plurality of values of the network node's DL reception timing include a current timing value and a previous timing value; and
the alternate timing offset (X) is determined based on the current timing value, the previous timing value, and the most recent previous second timing value.

10. The method of claim 7, further comprising determining the plurality of values of the network node's DL reception timing based on receiving a corresponding plurality of signals from the upstream node at a corresponding plurality of times.

11. The method of claim 1, wherein:
the network node's DL reception timing and UL transmission timing are associated with a mobile terminal (MT) comprising the network node; and
the network node's DL transmission timing is associated with a distributed unit (DU) comprising the network node.

12. The method of claim 1, wherein the network node's DL transmission timing is determined such that is substantially synchronized with the upstream node's DL transmission timing.

13. A non-transitory, computer-readable medium storing computer-executable instructions that, when executed by processing circuitry of a network node in an integrated access backhaul (IAB) network, configure the network node to perform operations corresponding to claim 1.

14. A network node configured for downlink (DL) transmission in an integrated access backhaul (IAB) network, the network node comprising:
communication interface circuitry configured to communicate with an upstream node and one or more downstream nodes in the IAB network; and
processing circuitry operably coupled to the communication interface circuitry, whereby the processing circuitry and the communication interface circuitry are configured to:
receive, from the upstream node, first timing offset information related to communications between the network node and the upstream node; and
transmit a DL signal or channel, to the one or more downstream nodes, based on a DL transmission timing for the network node determined from the following:
the network node's DL reception timing of signals or channels transmitted by the upstream node; and
a second timing value determined based on:
a first timing value determined from the first timing offset information based on a first mathematical function, when the first timing value is greater than a threshold; and
an alternate timing offset (X) not determined from the first timing offset information, when the first timing value is not greater than the threshold.

15. The network node of claim 14, wherein the first timing offset information comprises:
a value (TΔ) based on the upstream node's DL transmission timing and the upstream node's uplink (UL) reception timing; and
a timing advance (TA) for the network node's UL transmission timing relative to the network node's DL reception timing with respect to the upstream node, and
wherein the first mathematical function of the first timing offset information is TA/2+TΔ.

16. The network node of claim 14, wherein:
the first timing offset information is received at a first time; and
the processing circuitry and the communication interface circuitry are further configured to:
receive, from the upstream node at one or more previous times before the first time, respective one or more previous versions of the first timing offset information; and
determine one or more previous second timing values based on the respective one or more previous versions of the first timing offset information and the alternate timing offset (X).

17. The network node of claim 16, wherein the processing circuitry and the communication interface circuitry are further configured to determine the alternate timing offset (X) based on one of the following:
a third function of the previous second timing values; or
a fourth function of a plurality of values of the network node's DL reception timing.

18. The network node of claim 17, wherein:
the plurality of values of the network node's DL reception timing include a current timing value and a previous timing value; and
the alternate timing offset (X) is determined based on the current timing value, the previous timing value, and the most recent previous second timing value.

19. The network node of claim 17, wherein the processing circuitry and the communication interface circuitry are further configured to determine the plurality of values of the network node's DL reception timing based on receiving a corresponding plurality of signals from the upstream node at a corresponding plurality of times.

20. An integrated access backhaul (IAB) network comprising the network node of claim 16 and at least one of the following:
an upstream node comprising processing circuitry and communication interface circuitry that are configured to communicate with the network node; and one or more downstream nodes, wherein each downstream node includes processing circuitry and communication interface circuitry that are configured to communicate with the network node.

* * * * *

UNITED STATES PATENT AND TRADEMARK OFFICE
CERTIFICATE OF CORRECTION

Page 1 of 2

PATENT NO. : 11,751,158 B2
APPLICATION NO. : 17/438188
DATED : September 5, 2023
INVENTOR(S) : Dortschy et al.

It is certified that error appears in the above-identified patent and that said Letters Patent is hereby corrected as shown below:

On the Title Page

On Page 2, in Item (56), under "OTHER PUBLICATIONS", in Column 2, Line 23, delete "V14.0 0," and insert -- V14.0.0, --, therefor.

On Page 2, in Item (56), under "OTHER PUBLICATIONS", in Column 2, Line 40, delete "R1.1902434," and insert -- R1-1902434, --, therefor.

In the Drawings

In Fig. 16, Sheet 12 of 12, for Step "1610", in Line 2, delete "provided at" and insert -- provided by --, therefor.

In the Specification

In Column 4, Line 43, delete "remote radio unit" and insert -- remote radio unit or remote radio head --, therefor.

In Column 4, Line 51, delete "(AMF)," and insert -- (SMF), --, therefor.

In Column 5, Line 5, delete "mobile-type" and insert -- machine-type --, therefor.

In Column 6, Line 4, delete "set" and insert -- set of --, therefor.

In Column 7, Lines 2-3, delete "F1 application part protocol" and insert -- F1 application protocol --, therefor.

In Column 7, Lines 39-40, delete "access management function (AMF), and subscriber management function (SMF)" and insert -- access and mobility management function (AMF), and session management function (SMF) --, therefor.

Signed and Sealed this
Twenty-seventh Day of February, 2024

Katherine Kelly Vidal
*Director of the United States Patent and Trademark Office*

CERTIFICATE OF CORRECTION (continued)
U.S. Pat. No. 11,751,158 B2

In Column 8, Line 4, delete "UE sconnect" and insert -- UEs connect --, therefor.

In Column 8, Line 41, delete "show" and insert -- shown --, therefor.

In Column 9, Lines 22-23, delete "compared" and insert -- compared to --, therefor.

In Column 9, Line 54, delete "TΔ0, TΔ1, and TΔ2," and insert -- $T_{\Delta 0}$, $T_{\Delta 1}$, and $T_{\Delta 2}$, --, therefor.

In Column 9, Line 61, delete "TA2" and insert -- $T_{A2}$ --, therefor.

In Column 9, Line 62, delete "TA1" and insert -- $T_{A1}$ --, therefor.

In Column 11, Line 21, delete "one more" and insert -- one or more --, therefor.

In Column 12, Line 59, delete "(s)" and insert -- (X) --, therefor.

In Column 14, Line 64, delete "NodeB's." and insert -- NodeBs. --, therefor.

In Column 18, Line 8, delete "mobile-type" and insert -- machine-type --, therefor.

In Column 23, Line 39, delete "(SIM/RUIM) module," and insert -- module (SIM/RUIM), --, therefor.

In Column 26, Line 48, delete "to the" and insert -- to the access network 1211. --, therefor.

In Column 30, Line 19, delete "substep 1630" and insert -- step 1630 --, therefor.

In Column 32, Line 23, delete "TAB" and insert -- IAB --, therefor.

In Column 32, Line 26, delete "TAB" and insert -- IAB --, therefor.